US012750908B2

(12) United States Patent
Gu et al.

(10) Patent No.: US 12,750,908 B2
(45) Date of Patent: Sep. 29, 2026

(54) BEAM FAILURE RECOVERY INFORMATION INDICATION METHOD AND APPARATUS

(71) Applicant: HUAWEI TECHNOLOGIES CO., LTD., Shenzhen (CN)

(72) Inventors: Zhifang Gu, Shanghai (CN); Chunhua You, Shanghai (CN); Chong Lou, Shanghai (CN); Qiang Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 18/476,880

(22) Filed: Sep. 28, 2023

(65) Prior Publication Data

US 2024/0023184 A1 Jan. 18, 2024

Related U.S. Application Data

(63) Continuation of application No. PCT/CN2022/084091, filed on Mar. 30, 2022.

(30) Foreign Application Priority Data

Apr. 1, 2021 (CN) ......................... 202110356892.9

(51) Int. Cl.
*H04W 76/19* (2018.01)
*H04B 7/06* (2006.01)
(Continued)

(52) U.S. Cl.
CPC ........... *H04W 76/19* (2018.02); *H04W 16/28* (2013.01)

(58) Field of Classification Search
CPC ..... H04W 76/19; H04W 16/28; H04W 24/04; H04W 24/08; H04B 7/06964
See application file for complete search history.

(56) References Cited

U.S. PATENT DOCUMENTS

2020/0350972 A1* 11/2020 Yi .......................... H04B 7/088
2021/0068191 A1* 3/2021 Liu ....................... H04W 76/19
(Continued)

OTHER PUBLICATIONS

3GPP TS 38.321 V16.4.0, "3rd Generation Partnership Project; Technical Specification Group Radio Access Network; NR;Medium Access Control (MAC) protocol specification(Release 16)," Mar. 2021, 157 pages.
(Continued)

*Primary Examiner* — Harry H Kim
(74) *Attorney, Agent, or Firm* — Fish & Richardson P.C.

(57) ABSTRACT

Beam failure recovery methods and apparatuses are provided in this disclosure. In an implementation, a method includes: determining a beam failure recovery media access control control element (MAC CE), and sending the beam failure recovery MAC CE, wherein the beam failure recovery MAC CE comprises cell beam recovery information units of one or more cells of a terminal device, wherein the cell beam recovery information unit indicates beam recovery information of a corresponding cell, and the cell beam recovery information unit comprises: a cell indication (C) field indicating a cell corresponding to the cell beam recovery information unit, and a transmit/receive point (TRP) beam recovery information unit quantity indication (N) field indicating a quantity of TRP beam recovery information units in the cell beam recovery information unit, wherein the TRP beam recovery information units indicate beam recovery information of a TRP.

20 Claims, 17 Drawing Sheets

Serving cell ID: Serving cell identifier
Candidate RS ID or R bits: Candidate reference signal index or R bits

(51) Int. Cl.

| | |
|---|---|
| ***H04W 16/28*** | (2009.01) |
| ***H04W 24/04*** | (2009.01) |
| ***H04W 24/08*** | (2009.01) |

(56) References Cited

U.S. PATENT DOCUMENTS

| | | | | |
|---|---|---|---|---|
| 2021/0105058 | A1* | 4/2021 | Lin | H04W 72/1263 |
| 2022/0046441 | A1* | 2/2022 | Agiwal | H04L 5/0035 |
| 2022/0124861 | A1* | 4/2022 | You | H04B 7/0695 |
| 2022/0385351 | A1* | 12/2022 | Zhou | H04B 7/06964 |
| 2024/0063878 | A1* | 2/2024 | Li | H04B 7/06952 |
| 2024/0073710 | A1* | 2/2024 | Li | H04B 7/06964 |
| 2024/0314605 | A1* | 9/2024 | Alfarhan | H04W 24/02 |
| 2025/0105904 | A1* | 3/2025 | Cirik | H04L 5/0094 |
| 2025/0203595 | A1* | 6/2025 | Xu | H04W 72/046 |

OTHER PUBLICATIONS

3GPP TS 38.300 V16.5.0, "3rd Generation Partnership Project;Technical Specification Group Radio Access Network; NR; NR and NG-RAN Overall Description; Stage 2(Release 16)," Mar. 2021, 151 pages.

Qualcomm Incorporated, "Enhancements on beam management for multi-TRP," 3GPP TSG RAN WG1Meeting #103-e, R1-2009253, Oct. 26-Nov. 13, 2020, 6 pages.

Convida Wireless, "On Per-TRP Beam Failure Recovery," 3GPP TSG-RAN WG1#104-e, R1-2101416, e-Meeting, Jan. 25-Feb. 5, 2021, 5 pages.

Extended European Search Report in European AppIn No. 22779027.6, dated Jul. 16, 2024, 10 pages.

* cited by examiner

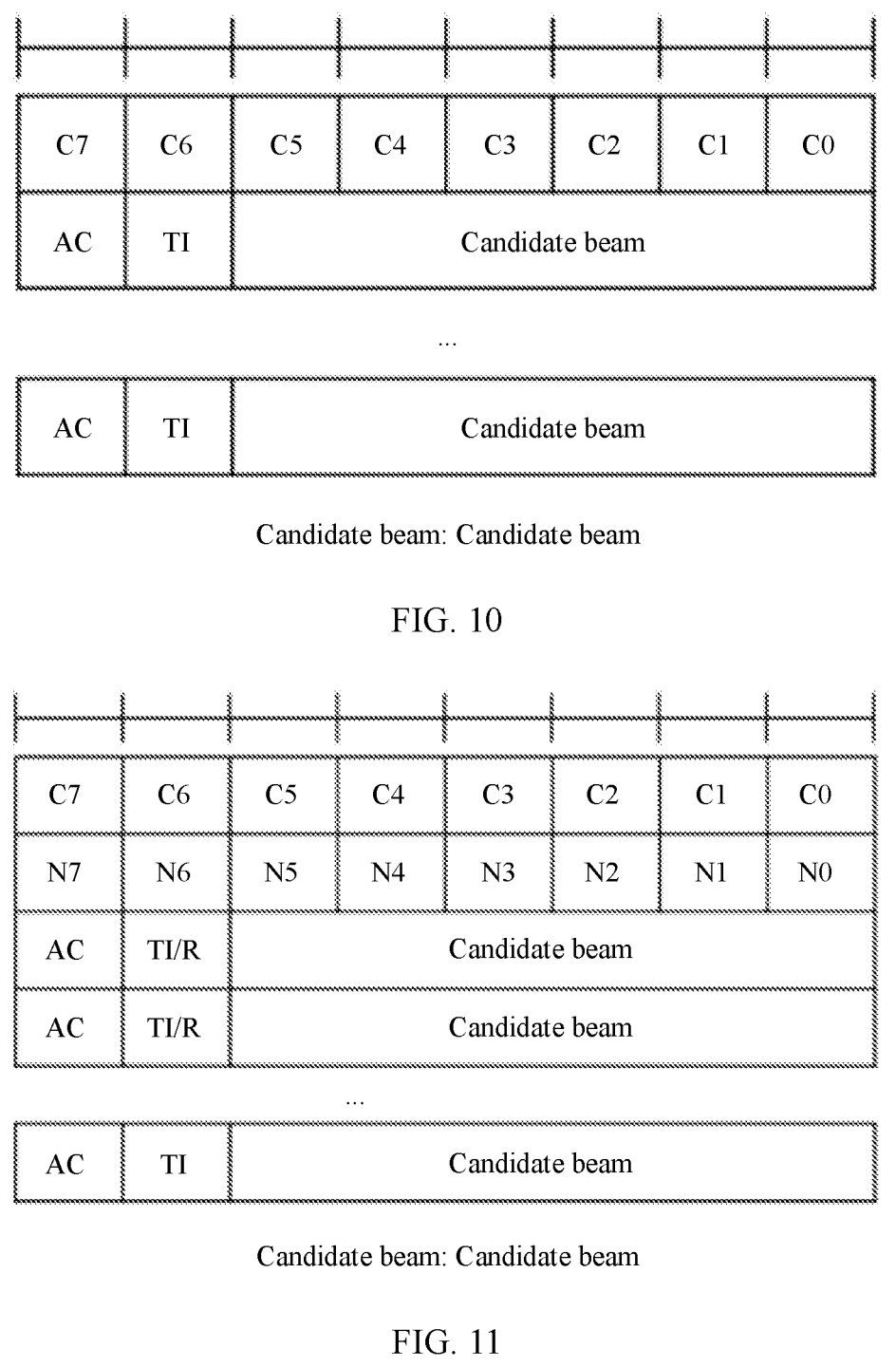

| | | | | | | | |
|---|---|---|---|---|---|---|---|
| C7 | C6 | C5 | C4 | C3 | C2 | C1 | C0 |
| AC | TI | Candidate beam | | | | | |

...

| | | | | | | | |
|---|---|---|---|---|---|---|---|
| AC | TI | Candidate beam | | | | | |

Candidate beam: Candidate beam

FIG. 10

| | | | | | | | |
|---|---|---|---|---|---|---|---|
| C7 | C6 | C5 | C4 | C3 | C2 | C1 | C0 |
| N7 | N6 | N5 | N4 | N3 | N2 | N1 | N0 |
| AC | TI/R | Candidate beam | | | | | |
| AC | TI/R | Candidate beam | | | | | |

...

| | | | | | | | |
|---|---|---|---|---|---|---|---|
| AC | TI | Candidate beam | | | | | |

Candidate beam: Candidate beam

FIG. 11

Candidate beam: Candidate beam

Candidate beam: Candidate beam

Serving cell ID: Serving cell identifier
Candidate RS ID or R bits: Candidate reference signal index or R bits Serving cell ID: Serving cell identifier
Candidate RS ID or R bits: Candidate reference signal index or R bits

| | | | | | | | |
|---|---|---|---|---|---|---|---|
| C="00001" | | | | | R="1" | N="01" | |
| AC="1" | TI="00" | | Candidate RS ID="00001" | | | | |
| AC="1" | TI="01" | | Candidate RS ID="00011" | | | | |

Candidate RS ID: Candidate reference signal index

FIG. 17

| | | | | | | | |
|---|---|---|---|---|---|---|---|
| C7="0" | C6="0" | C5="0" | C4="0" | C3="0" | C2="0" | C1="1" | C0="0" |
| N3="00" | | N2="00" | | N1="01" | | N0="00" | |
| N7="00" | | N6="00" | | N5="00" | | N4="00" | |
| AC="1" | TI="00" | | Candidate beam="00001" | | | | |
| AC="1" | TI="01" | | Candidate beam="00011" | | | | |

Candidate beam: Candidate beam

FIG. 18

BEAM FAILURE RECOVERY INFORMATION INDICATION METHOD AND APPARATUS

CROSS-REFERENCE TO RELATED APPLICATION

This application is a continuation application of International Patent Application No. PCT/CN2022/084091, filed on Mar. 30, 2022, which claims priority to Chinese Patent Application No. 202110356892.9, filed on Apr. 1, 2021. The disclosures of the aforementioned applications are hereby incorporated by reference in their entireties.

TECHNICAL FIELD

Embodiments of the present invention relate to communication technologies, and in particular, to a multiple transmit/receive point (multiple transmission reception point, mTRP) beam failure recovery method, an apparatus, a readable storage medium, and a system.

BACKGROUND

A beamforming technology is used to guide each signal to an optimal path of a terminal receiver, to improve signal strength, avoid signal interference, and improve communication quality. However, a transmission link based on a beam is easily blocked by an obstacle, and therefore an mTRP technology in which a terminal is connected to a plurality of access network devices is introduced, to enhance reliability and expand a coverage area.

However, a channel rapidly changes as the terminal moves or a posture of the terminal changes. As a result, communication quality of an originally established transmit/receive beam pair may sharply decrease, and a beam failure occurs. Therefore, it is very important to study a beam failure recovery technology.

SUMMARY

Embodiments of the present invention provide a beam failure recovery communication method and an apparatus. A terminal communicates with one or more access network devices in a cell. Before a beam failure occurs on an access network device, the terminal performs beam recovery on the access network device in advance, and selects, with reference to beam statuses of the access network devices that communicate with the terminal in the cell, an appropriate access network device to which a beam recovery request is sent. This reduces a possibility of the beam failure on the access network device in a network, and improves network reliability.

According to a first aspect, a communication method is provided. The method is performed by a terminal, or a component (a chip, a circuit, or the like) configured in the terminal, and includes: The terminal receives indication information of a first threshold and a second threshold. The terminal performs data communication with one or more access network devices in a cell of the terminal based on beams and collects statistics on quantities of beam failure instance times of the one or more access network devices, where when a quantity of beam failure instance times of an access network device is greater than or equal to the second threshold, a beam of the access network device is in a beam failure state; and when the quantity of beam failure instance times of the access network device is greater than the first threshold and less than the second threshold, the terminal performs beam recovery on the access network device.

In the foregoing implementation method, the terminal separately collects statistics on the quantities of beam failure instance times of the access network devices in the cell of the terminal, and when the quantity of beam failure instance times of the access network device is greater than or equal to the first threshold and less than the second threshold, recovery is performed, so that beam recovery is performed in advance before a beam failure occurs on the access network device. This reduces a possibility of the beam failure on the access network device, further reduces a possibility of the beam failure on the access network device in the cell, and improves network reliability and service continuity.

With reference to the first aspect, in a first possible implementation of the first aspect, that the terminal collects statistics on quantities of beam failure instance times of the one or more access network devices includes: The terminal separately collects statistics on a quantity of beam failure instance times of each of the one or more access network devices by using a beam failure instance counter and a beam failure detection timer.

The beam failure instance counter and the beam failure detection timer are set for each of the one or more access network devices, so that the terminal can collect statistics on the quantity of beam failure instance times of each access network device that communicates with the terminal. This can determine whether beam recovery needs to be performed on the access network device that communicates with the terminal.

With reference to the first aspect, or the first possible implementation of the first aspect, in a second possible implementation of the first aspect, that the terminal performs beam recovery based on a beam status of the access network devices in a first cell includes: The terminal searches for a candidate beam for the access network device to obtain a beam recovery request media access control control element MAC CE, where the beam recovery request MAC CE indicates beam recovery information of the access network device. The terminal determines, based on one of the following content, a target access network device to which the beam recovery request MAC CE is sent: reference signal received power RSRP of the one or more access network devices, an uplink grant of the cell received by the terminal, or the quantities of beam failure instance times of the one or more access network devices. The terminal sends the beam recovery request MAC CE to the target access network device, and after receiving a beam recovery response from the target access network device, determines that beam recovery is completed.

In the foregoing implementation, beam recovery is performed on the access network device by using the beam recovery request MAC CE, so that time required for beam recovery on the access network device can be reduced, and beam recovery efficiency and network reliability can be improved. In addition, the appropriate target access network device to which the beam recovery request MAC CE is sent is selected, which can increase a success rate of sending the beam recovery request MAC CE to the network side, and increase a success rate of beam recovery.

With reference to the second possible implementation of the first aspect, in a third possible implementation of the first aspect, the beam recovery request MAC CE includes at least a cell beam recovery information unit of the cell, the cell beam recovery information unit is used to indicate beam recovery information of a corresponding cell, and the cell beam recovery information unit includes at least one of the following content: a cell indication C field, used to indicate a cell corresponding to the cell beam recovery information unit; and an access network device beam recovery information unit quantity indication N field, used to indicate a quantity of access network device beam recovery information units in the cell beam recovery information unit, where the access network device beam recovery information unit is used to indicate beam recovery information of an access network device.

With reference to the third possible implementation of the first aspect, in a fourth possible implementation of the first aspect, the cell beam recovery information unit includes at least one access network device beam recovery information unit, and the access network device beam recovery information unit includes at least one of the following content: an available candidate beam indication AC field, used to indicate whether content in a candidate reference signal index candidate RS ID field is valid; a candidate reference signal index candidate RS ID field, used to indicate a reference signal index of a candidate beam; an access network device indication TI field, used to indicate the access network device corresponding to the access network device beam recovery information unit; or a beam failure indication BF field, used to indicate whether beam recovery needs to be performed on the access network device corresponding to the access network device beam recovery information unit.

In the foregoing implementation, the beam recovery request MAC CE indicates the beam recovery information of the access network device on which beam recovery needs to be performed, so as to quickly indicate the network device to perform beam recovery.

With reference to the first aspect or the first and the second possible implementations of the first aspect, in a fifth possible implementation of the first aspect, the method includes: The terminal receives an indication for deactivating an access network device. The terminal clears a beam failure instance counter corresponding to the access network device.

With reference to the first aspect or the first and the second possible implementations of the first aspect, in a fifth possible implementation of the first aspect, the method includes: The terminal receives an indication for activating an access network device. The terminal starts to collect statistics on a quantity of beam failure instance times of the access network device.

In the foregoing implementation, the access network device can control communication between the access network device and the terminal based on a beam failure state, to prevent the terminal from communicating with the access network device on which the beam failure frequently occurs. This reduces energy consumption of the terminal.

According to a second aspect, a communication method is provided. The method is performed by an access network device, or a component (a chip, a circuit, or the like) configured in the access network device, and includes: The access network device sends indication information of a first threshold and a second threshold to a terminal, and the access network device performs data communication with the terminal based on a beam, where when a quantity of beam failure instance times of the access network device is greater than or equal to the second threshold, the beam of the access network device is in a beam failure state; and when the quantity of beam failure instance times of the access network device is greater than the first threshold and less than the second threshold, the access network device receives beam recovery information indicated by the terminal.

With reference to the second aspect, in a first possible implementation of the second aspect, that when the quantity of beam failure instance times of the access network device is greater than the first threshold and less than the second threshold, the access network device receives beam recovery information indicated by the terminal includes: The access network device whose quantity of beam failure instance times is greater than the first threshold and less than the second threshold receives the beam recovery information indicated by the terminal; or an access network device other than the access network device whose quantity of beam failure instance times is greater than the first threshold and less than the second threshold receives the beam recovery information indicated by the terminal.

With reference to the second aspect, and the first possible implementation of the second aspect, in a second possible implementation of the second aspect, that the access network device receives beam recovery information indicated by the terminal includes: The access network device receives a beam recovery request MAC CE.

With reference to the second aspect, and the first and the second possible implementations of the second aspect, in a third possible implementation of the second aspect, the method includes: When the access network device that receives the beam recovery information indicated by the terminal is a first access network device, the first access network device sends a beam recovery response to the terminal; and if the beam recovery request MAC CE includes beam recovery information of a second access network device, the first access network device forwards the beam recovery information or the beam recovery request MAC CE to the second access network device.

With reference to the second and third possible implementations of the second aspect, in a fourth possible implementation of the second aspect, the beam recovery request MAC CE includes at least a cell beam recovery information unit, the cell beam recovery information unit is used to indicate beam recovery information of a corresponding cell, and the cell beam recovery information unit includes at least one of the following content: a cell indication C field, used to indicate a cell corresponding to the cell beam recovery information unit; and an access network device beam recovery information unit quantity indication N field, used to indicate a quantity of access network device beam recovery information units in the cell beam recovery information unit, where the access network device beam recovery information unit is used to indicate beam recovery information of an access network device.

With reference to the fourth possible implementation of the second aspect, in a fifth possible implementation of the second aspect, the cell beam recovery information unit further includes at least one access network device beam recovery information unit, and the access network device beam recovery information unit includes at least one of the following content: an available candidate beam indication AC field, used to indicate whether content in a candidate reference signal index candidate RS ID field is valid; a candidate reference signal index candidate RS ID field, used to indicate a reference signal index of a candidate beam; an access network device indication TI field, used to indicate the access network device corresponding to the access network device beam recovery information unit; or a beam failure indication BF field, used to indicate whether beam recovery needs to be performed on the access network device corresponding to the access network device beam recovery information unit.

With reference to the second aspect, and the first to the fifth possible implementations of the second aspect, in a sixth possible implementation of the second aspect, the method includes: The access network device sends an indication for deactivating an access network device to the terminal. The access network device stops communicating with the terminal.

With reference to the second aspect, and the first to the fifth possible implementations of the second aspect, in a seventh possible implementation of the second aspect, the method includes: The access network device sends an indication for activating an access network device to the terminal. The access network device starts to perform data transmission with the terminal.

According to a third aspect, a communication method is provided. The method is performed by a terminal, or a component (a chip, a circuit, or the like) configured in the terminal, and includes:

- determining a beam recovery request media access control control element MAC CE; and
- sending the beam recovery request MAC CE to a target access network device, where
- the beam recovery request MAC CE includes at least cell beam recovery information units of one or more cells of the terminal device, the cell beam recovery information unit is used to indicate beam recovery information of a corresponding cell, and the cell beam recovery information unit includes the following content:
- a cell indication C field, used to indicate a cell corresponding to the cell beam recovery information unit; and
- an access network device beam recovery information unit quantity indication N field, used to indicate a quantity of access network device beam recovery information units in the cell beam recovery information unit, where the access network device beam recovery information unit is used to indicate beam recovery information of an access network device.

According to a fourth aspect, a communication method is provided. The method may be performed by an access network device, for example, a target access network device, or a component (a chip, a circuit, or the like) configured in the access network device, and includes:

- receiving a beam recovery request MAC CE from a terminal, where
- the beam recovery request MAC CE includes at least cell beam recovery information units of one or more cells of the terminal device, the cell beam recovery information unit is used to indicate beam recovery information of a corresponding cell, and the cell beam recovery information unit includes the following content:
- a cell indication C field, used to indicate a cell corresponding to the cell beam recovery information unit; and
- an access network device beam recovery information unit quantity indication N field, used to indicate a quantity of access network device beam recovery information units in the cell beam recovery information unit, where the access network device beam recovery information unit is used to indicate beam recovery information of an access network device.

With reference to the third aspect or the fourth aspect, in a first possible implementation of the third aspect or the fourth aspect, the cell beam recovery information unit further includes at least one access network device beam recovery information unit, and the access network device beam recovery information unit includes one or more of the following content:

- an available candidate beam indication AC field, used to indicate whether content in a candidate reference signal index candidate RS ID field is valid;
- a candidate reference signal index candidate RS ID field, used to indicate a reference signal index of a candidate beam; or
- an access network device indication TI field, used to indicate the access network device corresponding to the access network device beam recovery information unit.

With reference to the third aspect or the fourth aspect, or the first possible implementation of the third aspect or the fourth aspect, in a second possible implementation of the third aspect or the fourth aspect, the target access network device is one of one or more access network devices that perform data communication with the terminal and that correspond to the one or more cells.

With reference to the second possible implementation of the third aspect or the fourth aspect, in a third possible implementation of the third aspect or the fourth aspect, the target access network device is an access network device of a cell in which the terminal receives an uplink grant.

With reference to the third aspect or the fourth aspect, or any one of the possible implementations of the third aspect or the fourth aspect, in a fourth possible implementation of the third aspect or the fourth aspect, the cell indicated by the cell indication C field includes a special cell SpCell.

With reference to the fourth possible implementation of the third aspect or the fourth aspect, in a fifth possible implementation of the third aspect or the fourth aspect, the special cell SpCell corresponds to a bit C0 in the cell indication C field.

With reference to the third aspect or the fourth aspect, the third aspect, or any one of the possible implementations of the third aspect or the fourth aspect, in a sixth possible implementation of the third aspect or the fourth aspect, the cell indication C field includes 8 bits C0 to C7 or 32 bits C0 to C31; each bit corresponds to one cell; and for each bit, if the bit is 1, it indicates that for a cell corresponding to the bit, in the beam recovery request MAC CE, a presence of beam recovery information of an access network device on which beam recovery needs to be performed; or if the bit is 0, it indicates that for a cell corresponding to the bit, in the beam recovery request MAC CE, beam recovery information of an access network device on which beam recovery needs to be performed is not present.

With reference to any one of the possible implementations of the third aspect or the fourth aspect, in a seventh possible implementation of the third aspect or the fourth aspect, the AC field occupies 1 bit; and when the AC field is 1, it indicates that the terminal finds an available candidate beam for a corresponding access network device; or when the AC field is 0, it indicates that the terminal does not find an available candidate beam for a corresponding access network device.

With reference to the third aspect or the fourth aspect, or any one of the possible implementations of the third aspect or the fourth aspect, in an eighth possible implementation of the third aspect or the fourth aspect, the access network device beam recovery information unit quantity indication N field occupies 8 bits or 32 bits; each bit corresponds to one cell; and for each bit, if the bit is 0, it indicates that a quantity of access network device beam recovery information units in a cell corresponding to the bit is 1; or if the bit is 1, it indicates that a quantity of access network device beam recovery information units in a cell corresponding to the bit is 2.

With reference to the third aspect or any possible implementation of the third aspect, in a ninth possible implementation of the third aspect, the method further includes:

before the sending the beam recovery request MAC CE, searching for candidate beams for the one or more access network devices in the one or more cells, to determine the beam recovery request MAC CE; and sending the beam recovery request MAC CE, and after receiving a beam recovery response from the target access network device, determining that beam recovery is completed.

With reference to the third aspect or any possible implementation of the third aspect, in a ninth possible implementation of the third aspect, the method further includes:

before the sending the beam recovery request MAC CE, collecting statistics on a quantity of beam failure instance times of each of the one or more access network devices in the one or more cells, and when the quantity of beam failure instance times of the access network device is greater than a first threshold and less than a second threshold, determining to perform beam recovery on the access network device.

With reference to the ninth possible implementation of the third aspect, in a tenth possible implementation of the third aspect, the method further includes:

when the quantity of beam failure instance times of the access network device is greater than or equal to the second threshold, determining that a beam of the access network device is in a beam failure state.

With reference to the ninth or the tenth possible implementation of the third aspect, in an eleventh possible implementation of the third aspect, the method further includes:

receiving indication information of the first threshold and the second threshold.

With reference to any one of the ninth to the eleventh possible implementations of the third aspect, in a twelfth possible implementation of the third aspect, the statistics on the quantity of beam failure instance times is collected by using a beam failure instance counter and a beam failure detection timer.

A fifth aspect of embodiments of this application provides a communication apparatus. The apparatus provided in this application has a function of implementing behavior of the base station or the terminal in the foregoing method aspects, and includes a corresponding means (means) configured to perform the steps or functions described in the foregoing method aspects. The steps or functions may be implemented by using software, or implemented by using hardware, or implemented by using a combination of hardware and software.

In a possible design, the apparatus includes one or more processors, and further, may include a communication unit. The one or more processors are configured to support the apparatus in performing a corresponding function of the base station in the foregoing method. For example, beam recovery is performed based on indication information in a beam recovery request. The communication unit is configured to support the apparatus in communicating with another device, to implement a receiving and/or sending function, for example, send indication information of a first threshold and a second threshold to a terminal.

Optionally, the apparatus may further include one or more memories. The memory is configured to be coupled to the processor, and the memory stores program instructions and/or data necessary for a base station. The one or more memories may be integrated with the processor, or may be disposed separately from the processor. This is not limited in this application.

The apparatus may be a base station, a next generation NodeB (Next Generation NodeB, gNB), a transmitting and receiving point (Transmitting and Receiving Point, TRP), a distributed unit (distributed unit, DU), a central unit (central unit, CU), or the like. The communication unit may be a transceiver or a transceiver circuit. Optionally, the transceiver may alternatively be an input/output circuit or an interface.

The apparatus may be a chip. The communication unit may be an input/output circuit or an interface of a chip.

In another possible design, the apparatus includes a transceiver, a processor, and a memory. The processor is configured to control the transceiver to receive and send a signal, the memory is configured to store a computer program, and the processor is configured to run the computer program in the memory, so that the apparatus performs the method completed by the base station in the second aspect or the fourth aspect.

In a possible design, the apparatus includes one or more processors, and further, may include a communication unit. The one or more processors are configured to support the apparatus in performing a corresponding function of the terminal in the foregoing method, for example, collect statistics on a quantity of beam recovery instance times of an access network device. The communication unit is configured to support the apparatus in communicating with another device, to implement a receiving and/or sending function, for example, receive indication information of a first threshold and a second threshold.

Optionally, the apparatus may further include one or more memories. The memory is configured to be coupled to the processor, and the memory stores program instructions and/or data necessary for the apparatus. The one or more memories may be integrated with the processor, or may be disposed separately from the processor. This is not limited in this application.

The apparatus may be an intelligent terminal, a wearable device, or the like, and the communication unit may be a transceiver or a transceiver circuit. Optionally, the transceiver may alternatively be an input/output circuit or an interface.

The apparatus may be a chip. The communication unit may be an input/output circuit or an interface of a chip.

In another possible design, the apparatus includes a transceiver, a processor, and a memory. The processor is configured to control the transceiver to receive and send a signal, the memory is configured to store a computer program, and the processor is configured to run the computer program in the memory, so that the apparatus performs the method completed by the terminal in the first aspect or the third aspect.

According to a sixth aspect, a system is provided. The system includes the foregoing base station.

Optionally, the system further includes the foregoing terminal.

According to a seventh aspect, a readable storage medium or a program product is provided, configured to store a program. The program includes instructions for performing the method in any one of the first aspect to the fourth aspect.

According to an eighth aspect, a readable storage medium or a program product is provided, configured to store a program. When the program is run on a computer, the computer is enabled to perform instructions of the method in any one of the first aspect to the fourth aspect.

It should be understood that the second aspect to the eighth aspect of this application correspond to the technical solutions of the first aspect of this application, and beneficial effects achieved by the aspects and the corresponding feasible implementations are similar. Details are not described again.

BRIEF DESCRIPTION OF DRAWINGS

FIG. 10 is a schematic diagram of a possible beam recovery request MAC CE according to an embodiment of this application;

FIG. 11 is a schematic diagram of a possible beam recovery request MAC CE according to an embodiment of this application;

FIG. 17 is a schematic diagram of a possible beam recovery request MAC CE according to an embodiment of this application;

FIG. 18 is a schematic diagram of a possible beam recovery request MAC CE according to an embodiment of this application;

DESCRIPTION OF EMBODIMENTS

Figure 1:
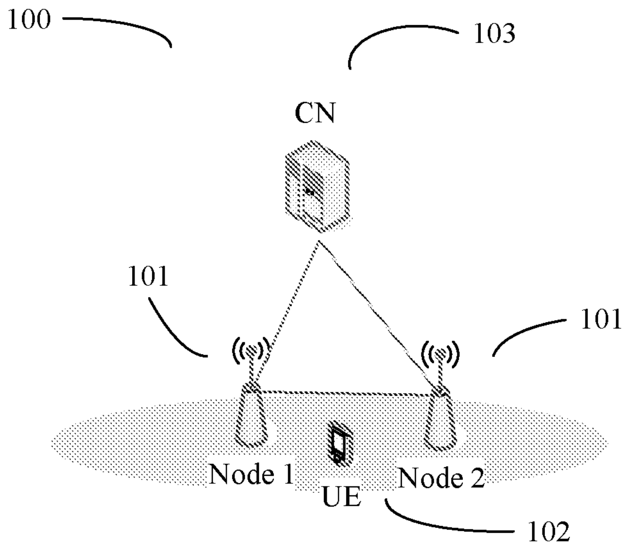
FIG. 1 is a schematic diagram of a communication system according to an embodiment of this application.

To clearly describe the technical solutions in embodiments of this application, words such as "first" and "second" are used in embodiments of this application to distinguish actions, apparatuses, units, or modules. For example, first information and second information are merely used to distinguish between different information, and do not limit sequences of the first information and the second information. A person skilled in the art may understand that the terms such as "first" and "second" do not limit a quantity or an execution sequence, and the terms such as "first" and "second" do not indicate a definite difference.

It should be noted that, in embodiments of this application, the word "example" or "for example" is used to represent giving an example, an illustration, or a description. Any embodiment or design scheme described as "an example" or "for example" in this application should not be construed as being more preferable or advantageous than other embodiments or design schemes. To be precise, the word such as "example" or "for example" is intended to present a related concept in a specific manner.

In embodiments of this application, "at least one item (piece)" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects, but may also indicate an "and/or" relationship. For details, refer to the context for understanding. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

The technical solutions in embodiments of this application may be used in various communication systems such as a long term evolution (long term evolution, LTE) system, a worldwide interoperability for microwave access (worldwide interoperability for microwave access, WiMAX) communication system, a 5th generation (5th generation, 5G) system, for example, a new radio (new radio access technology, NR) system, a network that integrates a plurality of systems, an internet of things system, an internet of vehicles system, and a future communication system such as a 6G system.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In embodiments of this application, different base stations may be base stations having different identifiers, or may be base stations that have a same identifier and that are deployed at different geographical positions. In some scenarios, before a base station is deployed, the base station does not know whether the base station is related to a scenario to which embodiments of this application are applied. The base station or a baseband chip may support the methods provided in embodiments of this application before being deployed. In some scenarios, the methods provided in embodiments of this application may alternatively be supported through upgrade or loading after deployment. It may be understood that the foregoing base stations having different identifiers may correspond to base station identifiers, or may correspond to cell identifiers or other identifiers.

In embodiments of this application, an NR network scenario in a wireless communication network is used as an example to describe some scenarios. It should be noted that the solutions in embodiments of this application can be applied to another wireless communication network, and a corresponding name may also be replaced with a name of a corresponding function in the another wireless communication network.

For ease of understanding embodiments of this application, a communication system shown in FIG. 1 is first used as an example to describe in detail a communication system to which embodiments of this application are applicable. FIG. 1 is a schematic diagram of a communication system to which a communication method according to an embodiment of this application is applicable. As shown in FIG. 1, the communication system 100 includes access network devices 101 (a gNB 1 and a gNB 2), user equipment (user equipment, UE) 102, and a core network device (core network, CN) 103. The access network device 101 may be configured with a plurality of antennas, and the UE 102 may also be configured with a plurality of antennas. The access network device and the core network device may be collectively referred to as a network device or a network side device, and an access network and a core network may be collectively referred to as a network side.

It should be understood that the access network device and the terminal may further include a plurality of components (for example, a processor, a modulator, a multiplexer, a demodulator, or a demultiplexer) related to signal sending and receiving.

The access network device is a radio access network (radio access network, RAN) node (or device) that connects the terminal to a wireless network, and may also be referred to as a base station. The access network device is a device that has a wireless transceiver function or a chip that may be disposed on the device. The device may cover various names in a broad sense, or may be replaced with the following names, for example, a NodeB (NodeB), an evolved NodeB (evolved NodeB, eNB), a gNB, a relay station, an access point, a transmit/receive point (transmission reception point, TRP), a transmission point (transmitting point, TP), a master eNodeB (master eNodeB, MeNB), a secondary eNodeB (secondary eNodeB, SeNB), a multi-standard radio (multi-standard radio, MSR) node, a home base station, a network controller, an access node, a radio node, an access point (access point, AP), a transmission node, a transceiver node, a baseband unit (baseband unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. The base station may be a communication module, a modem, or a chip that is disposed in the foregoing device or apparatus. The base station may alternatively be a mobile switching center, a device that bears a base station function in D2D, V2X, and M2M communication, a network side device in a 6G network, a device that bears a base station function in a future communication system, or the like. The base station may support networks of a same access technology or different access technologies. A specific technology and a specific device form that are used by the network device are not limited in embodiments of this application.

The device may be fixed or mobile. For example, a helicopter or an uncrewed aerial vehicle may be configured as a mobile base station, and one or more cells may move based on a position of the mobile base station. In other examples, a helicopter or an uncrewed aerial vehicle may be configured as a device for communicating with another base station.

Figure 2:
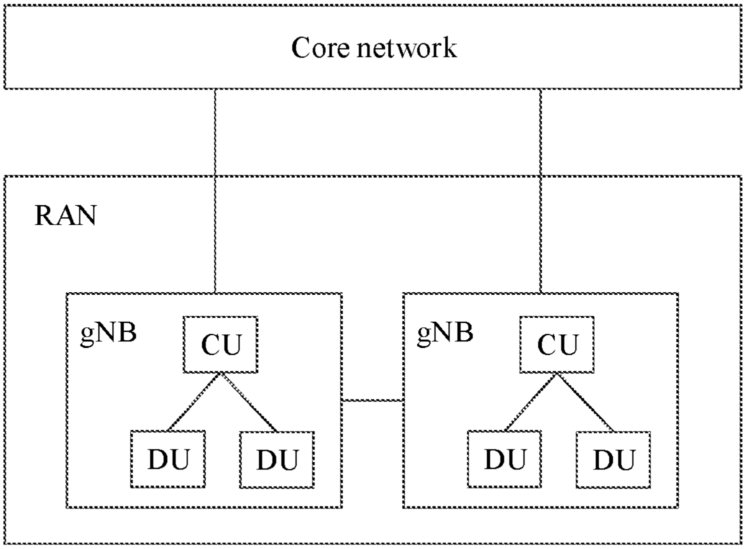
FIG. 2 is a schematic diagram of a network architecture in which a plurality of DUs share one CU according to an embodiment of this application.
Figure 3:
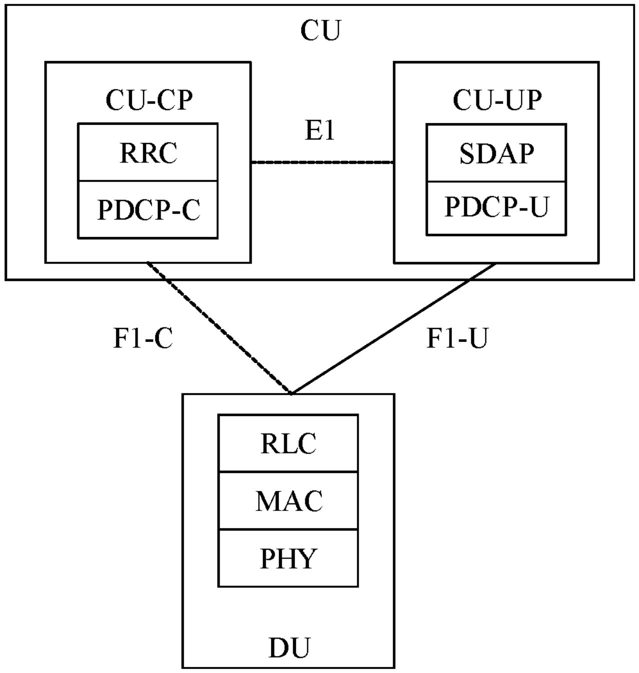
FIG. 3 is a schematic diagram of protocol layer functions of a CU and a DU according to an embodiment of this application.

In some deployments, the access network device (for example, a gNB) may include a BBU and an RRU. Some baseband functions, such as a beamforming function, may be implemented in the BBU, or may be implemented in the RRU. A connection interface between the BBU and the RRU may be a common public radio interface (common public radio interface, CPRI), or an enhanced common public radio interface (enhanced CPRI, eCPRI). In some other deployments, the access network device may include a CU and a DU. The CU and the DU may be understood as division into the base station from a perspective of logical functions. The CU and the DU may be physically separated, or may be deployed together. For example, a plurality of DUs may share one CU, or one DU may be connected to a plurality of CUs, and the CU and the DU may be connected through an F1 interface. For example, FIG. 2 is a schematic diagram of a network architecture in which a plurality of DUs share one CU according to an embodiment of this application. As shown in FIG. 2, a core network and a RAN are interconnected and communicate with each other, base stations in the RAN are separated into CUs and DUs, and a plurality of DUs share one CU. The network architecture shown in FIG. 2 is applied to a 5G communication system, and may alternatively share one or more components or resources with an LTE system. An access network device including a CU node and a DU node splits protocol layers. Functions of some protocol layers are centrally controlled by a CU, functions of remaining or all protocol layers are distributed in a DU, and the CU centrally controls the DU. In an implementation, as shown in FIG. 3, the CU is deployed with a radio resource control (radio resource control, RRC) layer, a packet data convergence protocol (packet data convergence protocol, PDCP) layer, and a service data adaptation protocol (service data adaptation protocol, SDAP) layer in a protocol stack; and the DU is deployed with a radio link control (radio link control, RLC) layer, a media access control (medium access control, MAC) layer, and a physical layer (physical layer, PHY) in the protocol stack. Therefore, the CU is capable of processing RRC, a PDCP, and an SDAP. The DU is capable of processing RLC, MAC, and the PHY. It may be understood that the foregoing function division is merely an example, and does not constitute a limitation on the CU and the DU.

Functions of the CU may be implemented by one entity, or may be implemented by different entities. For example, the functions of the CU may be divided, for example, separated into a control plane (control plane, CP) and a user plane (user plane, UP), namely, the control plane (CU-CP)

of the CU and the user plane (CU-UP) of the CU. For example, the CU-CP and the CU-UP may be implemented by different functional entities. The CU-CP and the CU-UP may be coupled to the DU to jointly implement functions of a base station. In a possible manner, the CU-CP is responsible for control plane functions, and mainly includes the RRC and a PDCP control plane PDCP-C. The PDCP-C is mainly responsible for one or more of encryption and decryption, integrity protection, data transmission, and the like of control plane data. The CU-UP is responsible for user plane functions, and mainly includes the SDAP and a PDCP user plane PDCP-U. The SDAP is mainly responsible for processing data of a core network and mapping a data flow (flow) to a bearer. The PDCP-U is mainly responsible for encryption and decryption, integrity protection, header compression, serial number maintenance, data transmission, and the like of a data plane. The CU-CP is connected to the CU-UP through an E1 interface. The CU-CP represents that the access network device is connected to the core network through an Ng interface. The CU-CP is connected to the DU through F1-C (control plane). The CU-UP is connected to the DU through F1-U (user plane). It may be understood that the access network device may be a CU node, a DU node, or a device including the CU node and the DU node. In addition, the CU may be classified as a device in a radio access network RAN, or the CU may be classified as a device in a core network CN. This is not limited herein.

A terminal may also be referred to as a terminal device, user equipment (user equipment, UE), an access terminal, a subscriber unit, a subscriber station, a mobile terminal (mobile terminal, MT), a mobile console (mobile station, MS), a remote station, a remote terminal, a mobile device, a user terminal, a wireless communication device, a user agent, a user apparatus, or the like. The terminal is a device that provides a user with voice and/or data connectivity, and may be configured to connect a person, an object, and a machine. The terminal in embodiments of this application may be a mobile phone (mobile phone), a tablet computer (Pad), a computer with a wireless transceiver function, a wearable device, a mobile internet device (mobile internet device, MID), a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application. In this application, methods and steps that are implemented by the terminal may also be implemented by a component (for example, a chip or a circuit) that may be used in the terminal. In this application, the terminal and the component (for example, the chip or the circuit) that may be disposed in the terminal are collectively referred to as a terminal device. Optionally, the terminal may also be configured to act as a base station. For example, the terminal may act as a scheduling entity that provides sidelink signals between terminals in V2X, D2D, or the like. For example, a cellular phone and a car communicate with each other through a sidelink signal. The cellular phone communicates with a smart home device without relaying a communication signal through a base station.

The core network device is a device in a CN that provides service support for a terminal. Currently, some examples of the core network device are as follows: an access and mobility management function (access and mobility management function, AMF) entity, a session management function (session management function, SMF) entity, and a user plane function (user plane function, UPF) entity, which are not listed one by one herein. The AMF entity may be responsible for access management and mobility management of the terminal. The SMF entity may be responsible for session management, for example, user session setup. The UPF entity is a user plane functional entity, and is mainly responsible for a connection to an external network. It should be noted that an entity in this application may also be referred to as a network element or a functional entity. For example, the AMF entity may also be referred to as an AMF network element or an AMF functional entity. For another example, the SMF entity may also be referred to as an SMF network element or an SMF functional entity.

In the communication system 100, both the gNB 1 and the gNB 2 may communicate with a plurality of UE. However, it should be understood that UE communicating with the gNB 1 and UE communicating with the gNB 2 may be the same or may be different. The UE 102 shown in FIG. 1 may communicate with both the gNB 1 and the gNB 2. However, FIG. 1 shows only a possible scenario. In some scenarios, the UE may communicate with only the gNB 1 or the gNB 2. This is not limited in this application. It should be understood that FIG. 1 is merely a simplified schematic diagram used as an example for ease of understanding. The communication system may further include another access network device, another terminal, or another core network device, which is not shown in FIG. 1. In NR and LTE systems, a radio resource control (radio resource control, RRC) status of UE includes a connected (RRC_CONNECTED) state, an idle (RRC_IDLE) state, and an inactive state (RRC_INACTIVE, or referred to as a third state). The RRC inactive (inactive) state is a state newly introduced when a terminal is connected to a 5G core network by using a base station, and the state is between the connected state and the idle state. In the RRC_INACTIVE state, there is no RRC connection between the terminal and an access network device, but the access network device and the core network device maintain a connection, and the terminal stores all or some information required for setting up/resuming a connection. Therefore, in the RRC_INACTIVE state, when the terminal needs to set up the connection, the terminal may quickly set up or resume the RRC connection to the access network device based on the stored related information.

When the UE is in the RRC_CONNECTED state, links are established between the UE, a base station, and a core network; and when data arrives at the network, the data can be directly transmitted to the UE. When the UE is in the RRC_INACTIVE state, links have been established between the UE, the base station, and the core network, but a link between the UE and the base station is released; and the base station stores UE context, and when data needs to be transmitted, the base station can quickly resume the link. When the UE is in the RRC_IDLE state, there is no link between the UE, the base station, and the network; and when data needs to be transmitted, the links between the UE, the base station, and the core network need to be established.

Figure 4:
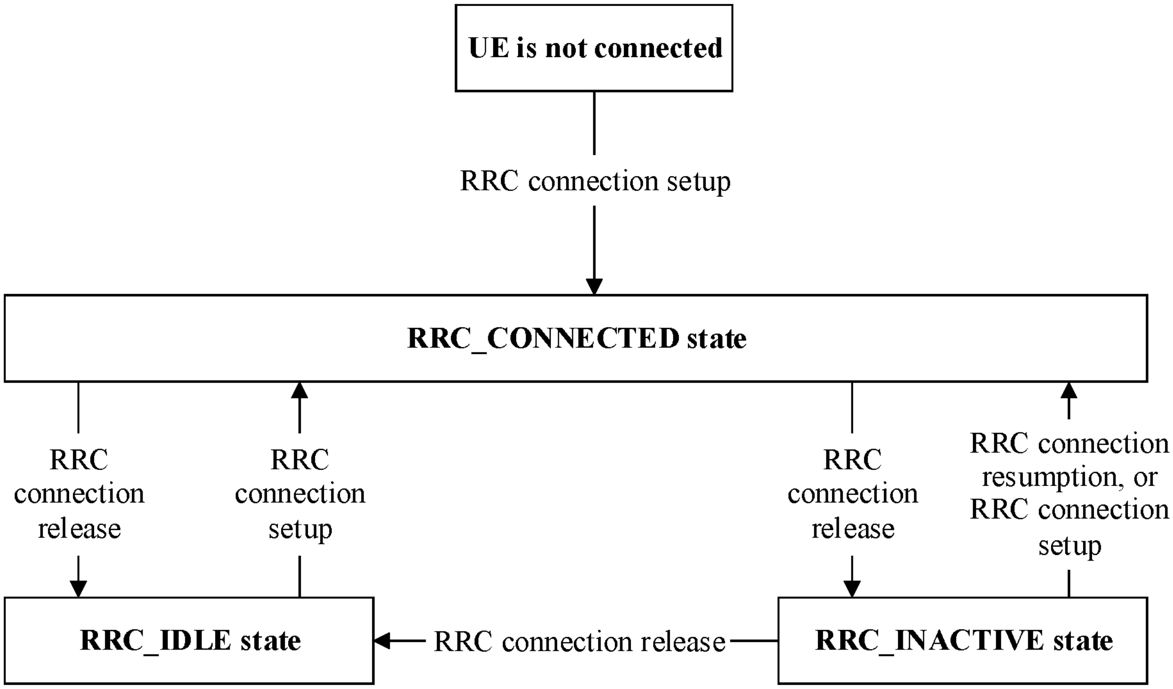
FIG. 4 is a schematic diagram of RRC status transition according to an embodiment of this application.

For example, FIG. 4 is a schematic diagram of RRC status transition according to an embodiment of this application. As shown in FIG. 4, in an RRC_IDLE state, UE may access a base station. In an access process or after accessing the base station, the UE may perform an RRC setup process with the base station, so that the status of the UE is switched from the RRC_IDLE state to an RRC_CONNECTED state.

In the RRC_IDLE state, after the UE receives a paging message from the base station or is triggered by a higher layer of the UE, the UE may initiate the RRC setup process, to attempt to set up an RRC connection to the base station to enter the RRC_CONNECTED state. When the UE is in the RRC_IDLE state, there is no RRC connection between the UE and the base station. When the UE is in the RRC_CONNECTED state, the base station may send an RRC release (RRCRelease) message to the UE in an RRC release process, so that the status of the UE changes from the RRC_CONNECTED state to the RRC_IDLE state or an RRC_INACTIVE state. When the UE is in the RRC_INACTIVE state, the UE may enter the RRC_IDLE state by releasing the RRC connection, or the UE may enter the RRC_CONNECTED state by resuming the RRC connection.

For ease of understanding, communication nouns or terms used in embodiments of this application are first explained and described. The communication nouns or terms are also used as a part of invention content of this application.

1. Multi-Cell Transmission

A cell, also referred to as a cellular cell, is an area covered by a base station or a part (a fan-sectorized antenna) of the base station in a cellular mobile communication system. In this area, a terminal may communicate with an access network device by using a transmission resource allocated by the base station.

The terminal may have communication connections to a plurality of access network devices and receive and send data. The plurality of access network devices may serve different cells. Dual-connectivity (dual-connectivity, DC) and carrier aggregation (carrier aggregation, CA) are used as examples for brief description.

In an implementation of the DC, the terminal has communication connections to two access network devices, and can receive and send data. One of the two access network devices (for example, base stations) may be responsible for exchanging a radio resource control message with the terminal, and responsible for interacting with a core network control plane entity. In this case, the access network device may be referred to as a master node (master node, MN). For example, the master node may be a MeNB or a MgNB, but is not limited thereto. The other access network device may be referred to as a secondary node (secondary node, SN). For example, the secondary node may be a SeNB or a SgNB, but is not limited thereto. The master node is a control plane anchor. To be specific, the terminal sets up an RRC connection to the master node, and the master node sets up a control plane connection to a core network. In the DC, a plurality of serving cells in the master node form a master cell group (master cell group, MCG), including one primary cell (primary cell, PCell) and optionally, one or more secondary cells (secondary cells, SCells). A plurality of serving cells in the secondary node form a secondary cell group (secondary cell group, SCG), including one primary secondary cell (primary secondary cell, PSCell) and optionally, one or more SCells. The serving cell is a cell configured by a network for the terminal to perform uplink and downlink transmission.

In an implementation of the CA, to efficiently use a fragmented spectrum, a communication system may support aggregation between different carrier units, and aggregate two or more carriers to support a higher transmission bandwidth. In a CA technology, the terminal may be configured with a plurality of carrier units (component carrier, CC, or referred to as a member carrier, a component carrier, a carrier, or the like), and each CC may correspond to an independent cell. Therefore, one CC may also be equivalent to one cell. For example, a primary cell PCell corresponds to a primary CC (or referred to as a primary carrier), and may be a cell for setting up an initial connection for the terminal, a cell for re-setting up an RRC connection, or a primary cell specified in a handover (handover) process. A secondary cell SCell corresponds to a secondary CC (or referred to as a secondary carrier), and may be a cell that is added during RRC reconfiguration and that is used to provide additional radio resources. For the terminal in a connected mode, if the carrier aggregation is not configured, the terminal has one serving cell; or if the carrier aggregation is configured, the terminal may have a plurality of serving cells (serving cells), which may be referred to as a serving cell set. For example, the serving cell (serving cell) set of the terminal includes the primary cell and the secondary cell. In other words, in a scenario in which the carrier aggregation is configured, the serving cell set includes at least one primary cell and at least one secondary cell. In other words, the terminal for which the carrier aggregation is configured may perform data transmission with one PCell and a plurality of SCells.

In a communication system, both a DC technology and the CA technology may be used. In the DC technology, the PCell and the PsCell each may be referred to as a special cell (special cell, SpCell). In the CA technology, the PCell may be referred to as a SpCell. That is, for the terminal, the serving cell includes all SpCells and all SCells.

2. Multi-TRP Transmission

A terminal device may be connected to and communicate with a plurality of TRPs in a same cell.

Figure 5:
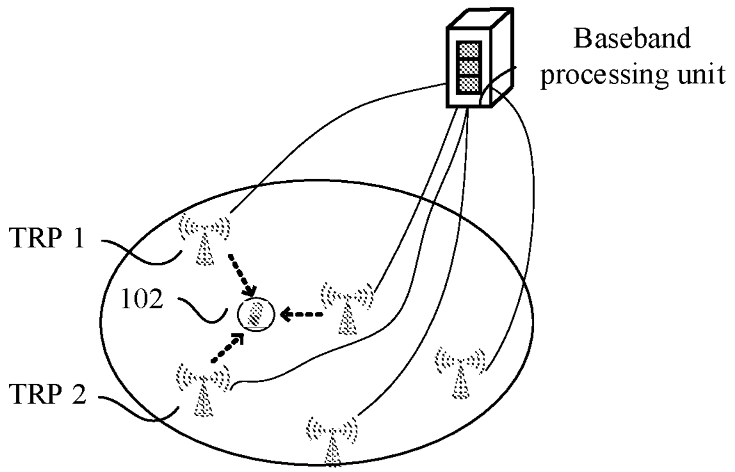
FIG. 5 is a schematic diagram of a plurality of TRPs in a cell according to an embodiment of this application.

A base station is a radio transmitter that is fixed in a geographical position. Physically, the plurality of TRPs may be essentially a group of antennas of the base station. As shown in FIG. 5, an architecture of the base station may be that one baseband processing unit in one geographical position, and the baseband processing unit is connected to the plurality of TRPs in a plurality of geographical positions. Each TRP may include a radio frequency processing unit and antennas. For example, as shown in FIG. 5, the plurality of TRPs in the geographical positions may each have one radio frequency processing unit and one group of antennas. The baseband processing unit and a radio frequency processing unit of a transmission point may be connected through an optical fiber. The TRPs may communicate with each other through an ideal backhaul (ideal backhaul) or a non-ideal backhaul (non-ideal backhaul).

A cell may be an area covered by the plurality of TRPs of the base station. That there are a plurality of TRPs in a cell may also be understood as that the terminal may communicate with a base station in the cell by using the plurality of TRPs. In embodiments of this application, division is performed based on a cell served by a TRP. To be specific, if the TRP serves a first cell, the TRP is referred to as a TRP in the first cell.

In a multi-TRP scenario, multi-TRP transmission may be classified into two types based on downlink control information (downlink control information, DCI): multi-TRP transmission with a plurality of pieces of DCI, or multi-TRP transmission with a single piece of DCI. The terminal may identify the multi-TRP transmission type based on a parameter configured by a network device. An NR system is used as an example. An RRC parameter control-resource set pool index (control-resource set pool index, CORESETPoolIndex) may be used for identification. For the multi-TRP transmission with the plurality of pieces of DCI, scheduling information of different TRPs is carried in physical downlink control channel (physical downlink control channel, PDCCH) resources indicated by different CORESETPoolIndexes, and one PDCCH schedules a physical downlink shared channel (physical downlink shared channel, PDSCH) of one TRP. For the multi-TRP transmission with the single piece of DCI, the network device indicates, by using a transmission configuration indication (transmission configuration indication, TCI), time domain resource assignment (time domain resource assignment, TDRA), and an antenna port that are in the DCI, the terminal to perform data transmission with the plurality of TRPs.

3. Beam (Beam)

In a communication system, a high-frequency band is used for communication transmission. A main problem of the high-frequency communication is that signal energy sharply decreases as a transmission distance increases, and this results in a short signal transmission distance. To overcome this problem, a beamforming technology is used in the high-frequency communication, and a large-scale antenna array is used for weighted processing, so that signal energy is concentrated in a small range, to form a signal similar to an optical beam (the signal is referred to as a beam), thereby extending a transmission distance.

The beam is a communication resource. The beam may be a wide beam, a narrow beam, or a beam of another type. A technology for forming the beam may be the beamforming technology or another technical means. The beamforming technology may be specifically a digital beamforming technology, an analog beamforming technology, a hybrid beamforming technology, or the like. Different beams may be considered as different resources. Same information or different information may be sent based on the different beams. Optionally, a plurality of beams having a same communication feature or similar communication features may be considered as one beam.

Beams include a transmit beam (which may also be referred to as a transmitted beam) and a receive beam. The transmit beam may indicate distribution of signal strength formed in different directions in space after a signal is transmitted by using an antenna, and the receive beam may indicate distribution that an antenna array enhances or weakens reception of a radio signal in different directions in space.

The beam may be understood as a spatial filter (spatial filter) or a spatial parameter (spatial parameter). A beam for sending a signal may be referred to as a transmit beam (transmission beam, namely, a Tx beam), a spatial domain transmit filter (spatial domain transmit filter), or a spatial domain transmit parameter (spatial domain transmit parameter). A beam for receiving a signal may be referred to as a receive beam (reception beam, namely, an Rx beam), a spatial domain receive filter (spatial domain receive filter), or a spatial domain receive parameter (spatial domain receive parameter).

Currently, in a scenario in which there are a plurality of access network devices such as TRPs in a cell, there is no perfect beam recovery mechanism. To resolve the foregoing problem, the present invention provides a method. The method includes: A terminal receives indication information of a first threshold and a second threshold. The terminal performs beam failure instance statistics collection on one or more access network devices that are in a cell of the terminal and that perform data communication with the terminal. The terminal performs beam recovery on the access network device whose quantity of beam failure instance times is greater than or equal to the first threshold and less than the second threshold. The terminal selects to send a beam recovery request MAC CE to a target access network device to which the beam recovery request MAC CE is sent. The method can reduce a possibility that a beam failure occurs in the access network device, improve network reliability, and also reduce a possibility that beam recovery needs to be performed by using random access for a long time when all beams of the access network device that performs data communication with the terminal and that is in the SpCell fail.

Descriptions are provided below by using an example in which a terminal sets up connections to one or more TRPs in a cell of the terminal and performs data transmission. It should be noted that in the present invention, a TRP is used as an access network device for description, and a specific type of the access network device is not limited.

Figure 6:
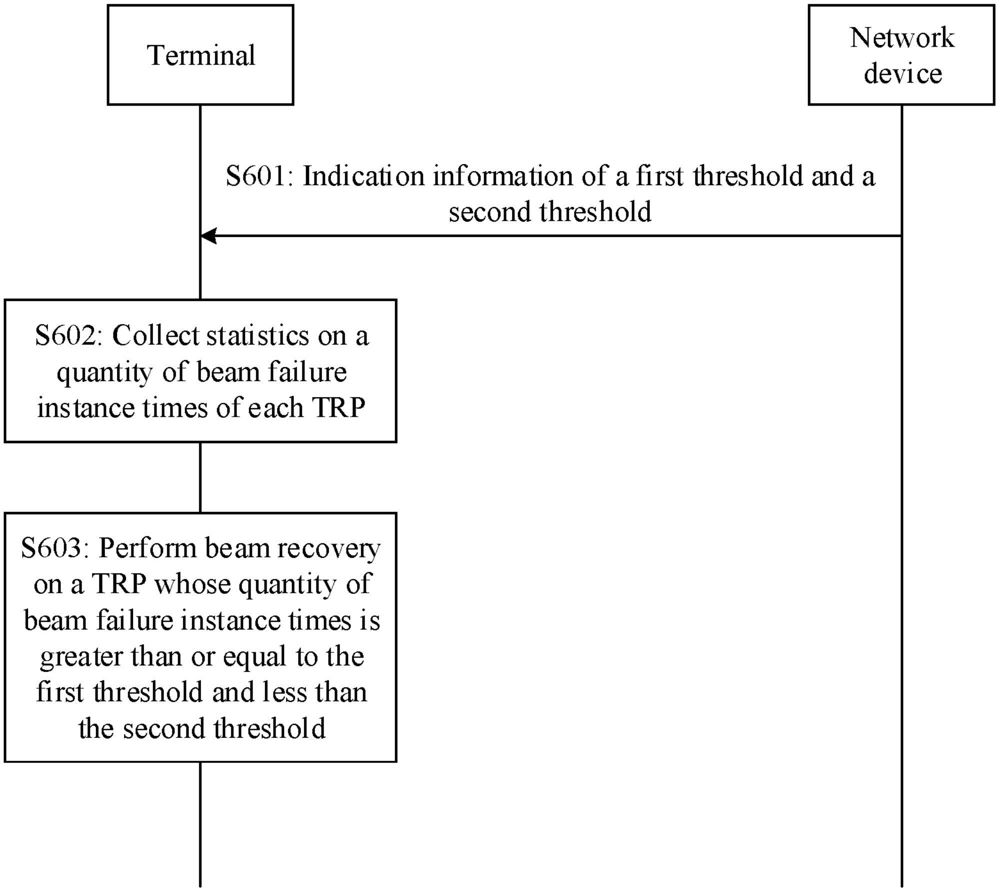
FIG. 6 is a flowchart of a possible implementation according to an embodiment of this application.

FIG. 6 shows a possible beam recovery implementation method, including the following steps.

S601: A terminal receives indication information of a first threshold and a second threshold.

The terminal sets up a connection to at least one cell, and performs data communication with one or more TRPs in the cell.

The terminal receives the indication information of the first threshold and the second threshold, where the first threshold and the second threshold may be used to determine a beam status of the TRP, and the beam status of the TRP includes the following content: If a quantity of beam failure instance times is greater than or equal to the second threshold, the beam status of the TRP is a beam failure; or if a quantity of beam failure instance times is greater than or equal to the first threshold and less than the second threshold, the beam status of the TRP is a beam pre-failure; or if a quantity of beam failure instance times is less than the first threshold, the beam status of the TRP is beam normal. In a possible implementation, a network device sets the first threshold and the second threshold based on a transmission reliability requirement of a service type in the cell.

The network device may send the first threshold and the second threshold to the terminal by using different indication information or same indication information. For example, the indication information may be carried by using one of RRC signaling, DCI, or a MAC CE.

The indication information of the first threshold and the second threshold may be a specific value. Alternatively, an index of the threshold may be agreed in a protocol, and a specific value is indicated by using the index. For example, as shown in Table 1, a possible index-threshold correspondence is provided. The network side may indicate to the terminal that the first threshold is “01”, that is, the first threshold is 4, and the second threshold is “11”, that is, the second threshold is 16.

TABLE 1

Example of an index-threshold comparison table

| Index | Threshold |
|---|---|
| 00 | 2 |
| 01 | 4 |
| 10 | 8 |
| 11 | 16 |

It may be understood that the terminal may further receive other configuration information related to the beam failure, including related configurations in the conventional technology. Details are not described herein.

S602: The terminal collects statistics on the quantity of beam failure instance times of the TRP that performs data communication with the terminal.

In this embodiment, the terminal performs, based on a beam, data communication with the one or more TRPs in the cell of the terminal. The data communication may be data service communication, or may be non-data service control information communication.

The terminal side measures link quality of the beam based on a configuration of a base station, and compares a measurement result with a measurement threshold configured by the base station for determining a beam failure instance, to determine whether the current beam in current measurement is a beam failure instance.

The terminal collects, by using a beam failure instance counter and a beam failure detection timer, statistics on a quantity of beam failure instance times of each TRP that performs data communication in the cell. For example, if the terminal determines that the beam of the TRP is the beam failure instance, the beam failure instance counter corresponding to the TRP is increased by 1, and the beam failure detection timer is restarted. When the beam failure detection timer corresponding to the TRP expires, or when the terminal receives a beam recovery response corresponding to a beam recovery request from the TRP, the beam failure counter corresponding to the TRP is cleared, and the beam failure detection timer is restarted. It should be noted that a specific implementation in which the terminal collects statistics on the quantity of beam failure instance times by using the beam failure instance counter and the beam failure detection timer may be implemented based on the conventional technology. Details are not described herein.

When a value of a beam failure instance counter corresponding to one TRP exceeds the second threshold, the terminal may determine that the beam status of the TRP is the beam failure.

S603: The terminal performs beam recovery on the TRP whose quantity of beam failure instance times is greater than or equal to the first threshold and less than the second threshold.

In this embodiment, the terminal may first determine the beam status of the TRP. For example, the terminal compares each of the first threshold and the second threshold with the quantity of beam failure instance times of the TRP that performs data communication. When the quantity of beam failure instance times of the TRP is greater than the first threshold and less than the second threshold, the terminal determines that the beam is in a pre-failure state, and performs beam recovery on the TRP whose beam status is a beam pre-failure.

According to the implementation method, the first threshold is introduced, so that beam recovery can be performed in advance on a TRP whose beam performance is poor and a TRP on which the beam failure may occur, thereby improving network reliability. For a SpCell, this can reduce a probability that random access beam recovery is required due to the beam failure.

Figure 7:
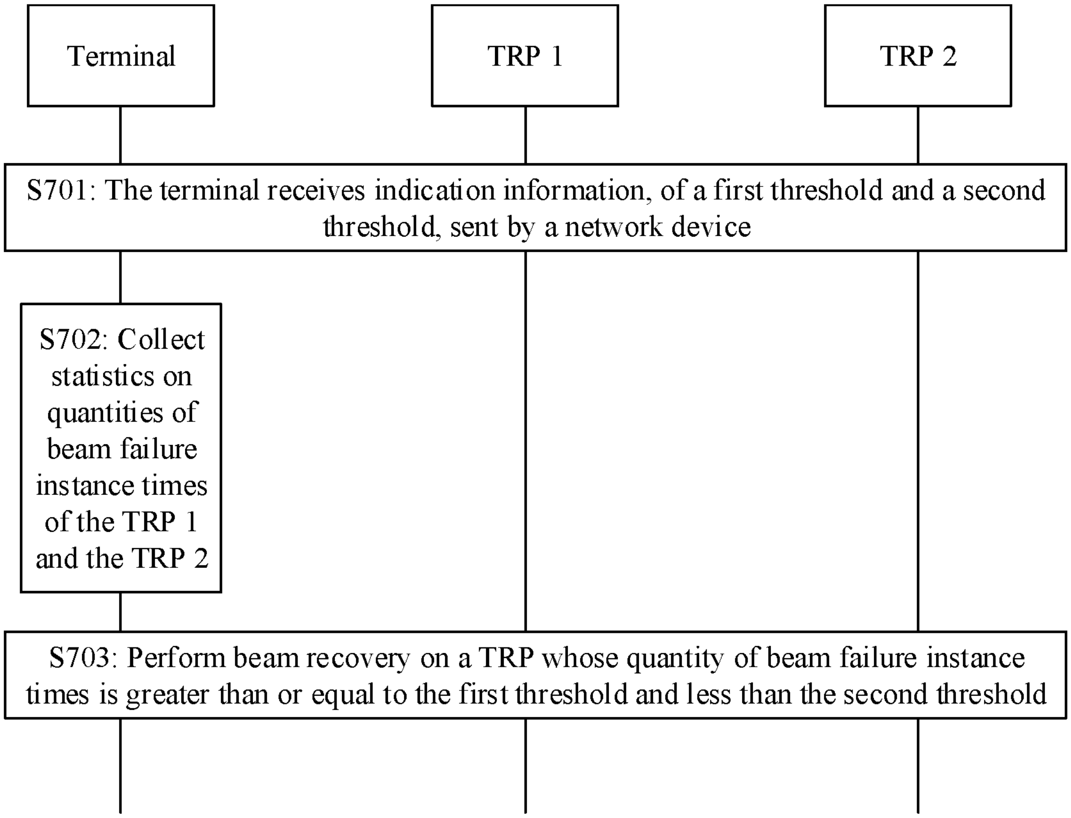
FIG. 7 is a flowchart of a possible implementation according to an embodiment of this application.

For example, the following provides a possible implementation method by using an example in which a terminal is connected to and communicates with a TRP 1 and a TRP 2 in a cell. As shown in FIG. 7, the method includes the following steps.

S701: The terminal receives indication information, of a first threshold and a second threshold, sent by a network device.

Refer to related content in S601. Details are not described again.

S702: The terminal collects statistics on a quantity of beam failure instance times of each of the TRP 1 and the TRP 2.

The terminal collects statistics on the quantity of beam failure instance times of the TRP 1 by using a first beam failure instance counter and a first beam failure detection timer, and collects statistics on the quantity of beam failure instance times of the TRP 2 by using a second beam failure instance counter and a second beam failure detection timer.

S703: The terminal performs beam recovery on a TRP whose quantity of beam failure instance times is greater than or equal to the first threshold and less than the second threshold.

Optionally, the terminal compares the first threshold and the second threshold with the quantity of beam failure instance times of the TRP 1, to obtain a beam status of the TRP 1; and compares the first threshold and the second threshold with the quantity of beam failure instance times of the TRP 2, to obtain a beam status of the TRP 2.

Figure 8:
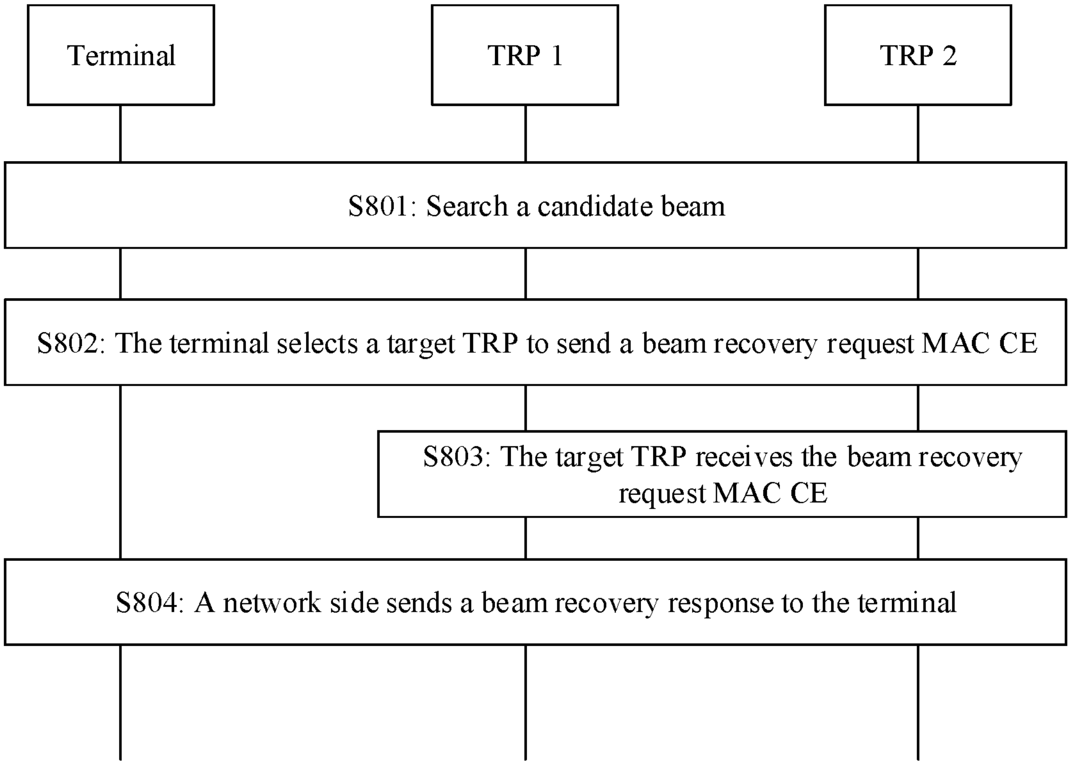
FIG. 8 is a flowchart of possible beam recovery according to an embodiment of this application.

Specifically, the terminal performs, by sending a beam recovery request MAC CE, beam recovery on the TRP whose quantity of beam failure instance times is greater than or equal to the first threshold and less than the second threshold. As shown in FIG. 8, there are the following possible implementations.

S801: The terminal determines the TRP on which beam recovery needs to be performed, and searches for a candidate beam for the TRP.

The terminal measures, based on a configuration of a base station, all beams of the TRP on which beam recovery needs to be performed, and if a measurement result of a beam is greater than or equal to a candidate beam determining threshold configured by the base station, the terminal determines that the beam can be used as the candidate beam. After all the beams of the TRP are measured and the candidate beam determining threshold is compared, a candidate beam searching process of the TRP is completed. The beam recovery request MAC CE may indicate beam recovery information of the TRP that completes candidate beam searching.

S802: The terminal selects the target TRP to send the beam recovery request MAC CE.

There are the following possible implementations in which the terminal sends the beam recovery request MAC CE.

In a possible implementation, after obtaining information required by the beam recovery request MAC CE, the terminal sends the beam recovery request MAC CE by using an uplink resource indicated in first received uplink grant information that is in the cell and that can be used to send the beam recovery request MAC CE.

In a possible implementation, the terminal measures signals of the TRPs that perform communication, selects a TRP having a good signal as the target TRP for sending the beam recovery request MAC CE, and sends the beam recovery request MAC CE by using an uplink resource of the target TRP. For example, the terminal obtains CSI-RS RSRP measurement values of the TRP 1 and the TRP 2, where the CSI-RS RSRP measurement value of the TRP 1 is greater than the CSI-RS RSRP measurement value of the TRP 2, determines that a signal of the TRP 1 is good, and uses the TRP 1 as the target TRP. The terminal device obtains, based on a CORESETPoolIndex corresponding to the TRP 1, CORESET corresponding to the TRP 1, and after obtaining the uplink grant information detected in a PDCCH in CORESET, sends the beam recovery request MAC CE by using the uplink resource indicated in the uplink grant information. Optionally, the terminal may further measure signals of TRPs in another cell of the terminal, and select a TRP having a good signal in the another cell as the target TRP for sending the beam recovery request MAC CE.

In a possible implementation, the terminal selects the target TRP based on a beam status of a TRP. For example, when the beam status of the TRP 1 is a beam failure, and the beam status of the TRP 2 is beam normal, the terminal may directly select the TRP 2 as the target TRP.

S803: The target TRP receives the beam recovery request MAC CE.

The target TRP receives the beam recovery request MAC CE.

The target TRP performs beam recovery based on an indication in the beam recovery request MAC CE. If a TRP corresponding to the beam recovery information in the beam recovery request MAC CE is not the target TRP, the target TRP forwards, by using an ideal backhaul or a non-ideal backhaul, the beam recovery request MAC CE or the beam recovery information in the beam recovery request MAC CE to the TRP corresponding to the beam recovery information.

S804: Send a beam recovery response to the terminal.

For the beam recovery response, in a possible implementation method, refer to an implementation in the conventional technology. For example, an uplink grant that is sent by the TRP to the terminal after the TRP receives the beam recovery request MAC CE and that indicates new transmission is used as the beam recovery response, and a HARQ process indicated in the uplink grant is the same as a HARQ process used by the terminal to transmit the beam recovery request MAC CE.

In a possible implementation method, the target TRP sends the beam recovery response to the terminal. In another possible implementation, it is agreed in a protocol, or the target TRP indicates, at least one TRP on which beam recovery needs to be performed, to send the beam recovery response to the terminal. When forwarding beam recovery related information to the TRP that sends the beam recovery response, the target TRP further needs to forward HARQ information required for sending the beam recovery response.

After receiving the beam recovery response, the terminal determines that beam recovery is completed.

It should be noted that, if beam failures occur on all the TRPs in the cell, for a SpCell, beam recovery is performed in a random access manner. For an SCell, refer to content in S801 to S804, and the beam recovery request MAC CE is sent by a TRP whose beam is normal or whose beam pre-fails in another cell.

According to the foregoing method, beam recovery is performed on the TRP whose beam pre-fails, to avoid a case in which beam failures occur on a plurality of TRPs or all the TRPs in the cell, and further improve service continuity. For the SpCell, this can reduce a possibility that beam recovery needs to be performed in a time-consuming random access manner when the beam failures occur on all the TRPs. Specifically, that the terminal determines the TRP on which beam recovery needs to be performed, and searches for the candidate beam for the TRP includes the following possible implementations.

Figure 9A:
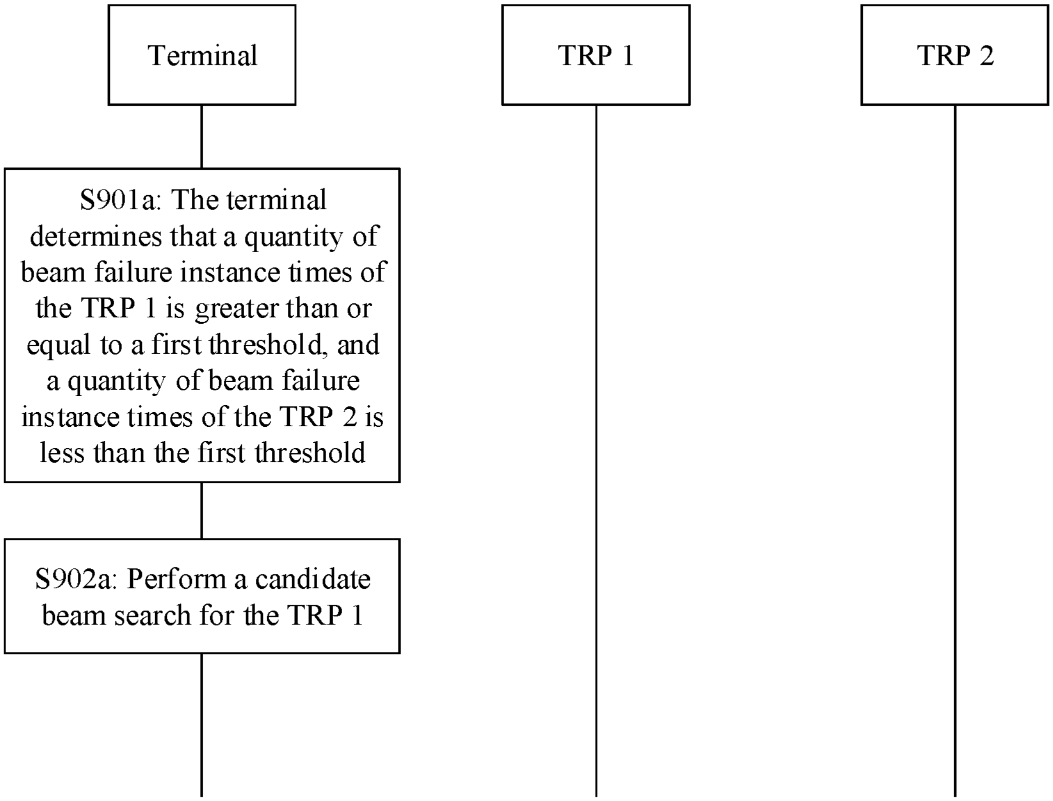
FIG. 9*a* is a flowchart of possible candidate beam searching according to an embodiment of this application.

As shown in FIG. 9*a*, in a possible implementation, that the terminal performs beam recovery on a TRP when a quantity of beam failure instance times of only the TRP is greater than or equal to the first threshold and less than the second threshold includes the following steps.

S901*a*: The terminal determines that the quantity of beam failure instance times of the TRP 1 is greater than or equal to the first threshold and less than the second threshold, and the quantity of beam failure instance times of the TRP 2 is less than the first threshold.

S902*a*: The terminal searches for a candidate beam for the TRP 1.

Figure 9B:
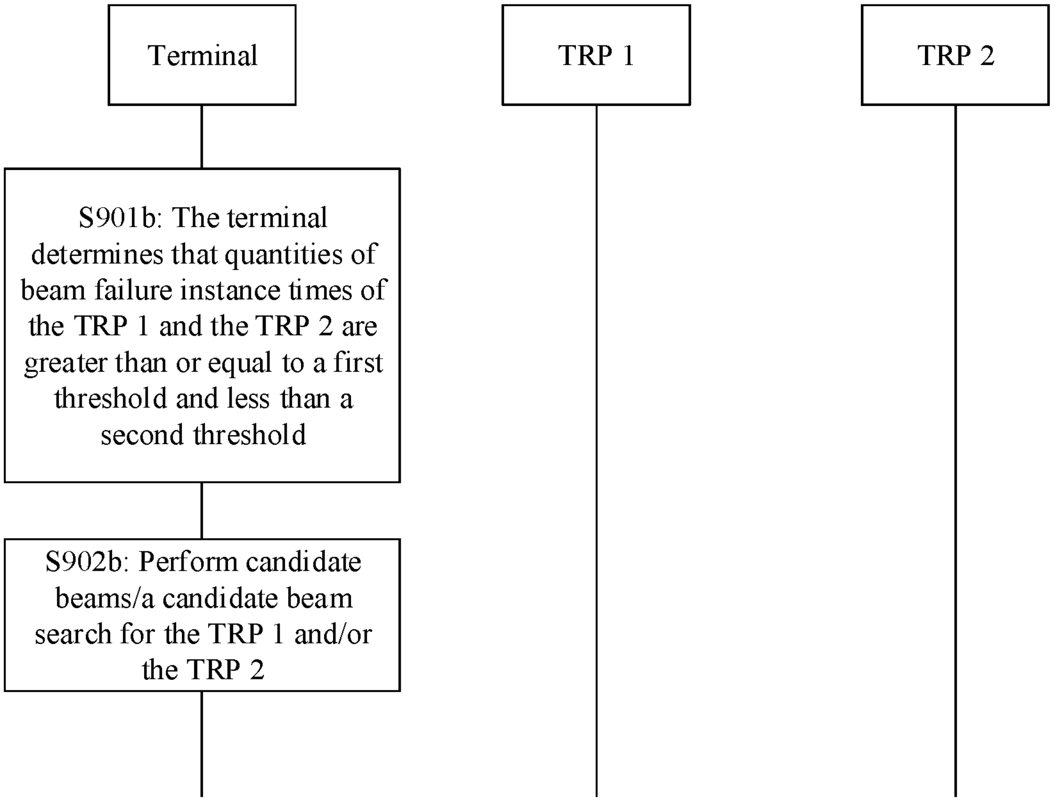
FIG. 9*b* is a flowchart of possible candidate beam searching according to an embodiment of this application.

As shown in FIG. 9*b*, in a possible implementation, that the terminal performs beam recovery on at least one TRP when quantities of beam failure instance times of the plurality of TRPs that communicate with the terminal in the cell are greater than or equal to the first threshold and less than the second threshold includes the following steps.

S901*b*: The terminal determines that the quantities of beam failure instance times of the TRP 1 and the TRP 2 are greater than or equal to the first threshold and less than the second threshold.

S902*b*: The terminal searches for candidate beams/a candidate beam for the TRP 1 and/or the TRP 2, that is, performs candidate beams/a candidate beam search for the TRP 1 and/or the TRP 2.

In a possible implementation, the terminal selects the TRP whose beam pre-fails and searches for the candidate beam. For example, the terminal selects, based on the quantities of beam failure instance times of the TRPs, a TRP whose quantity of beam failure instance times is large, and searches for the candidate beam.

In a possible implementation, the terminal searches for the candidate beams for the TRP 1 and the TRP 2, and after completing candidate beam searching for at least one of the TRP 1 or the TRP 2, or after completing candidate beam searching for the TRP 1 and the TRP 2, the terminal may send the beam recovery request MAC CE.

The beam recovery request MAC CE includes beam recovery information of all TRPs that complete a candidate beam searching process.

Figure 9C:
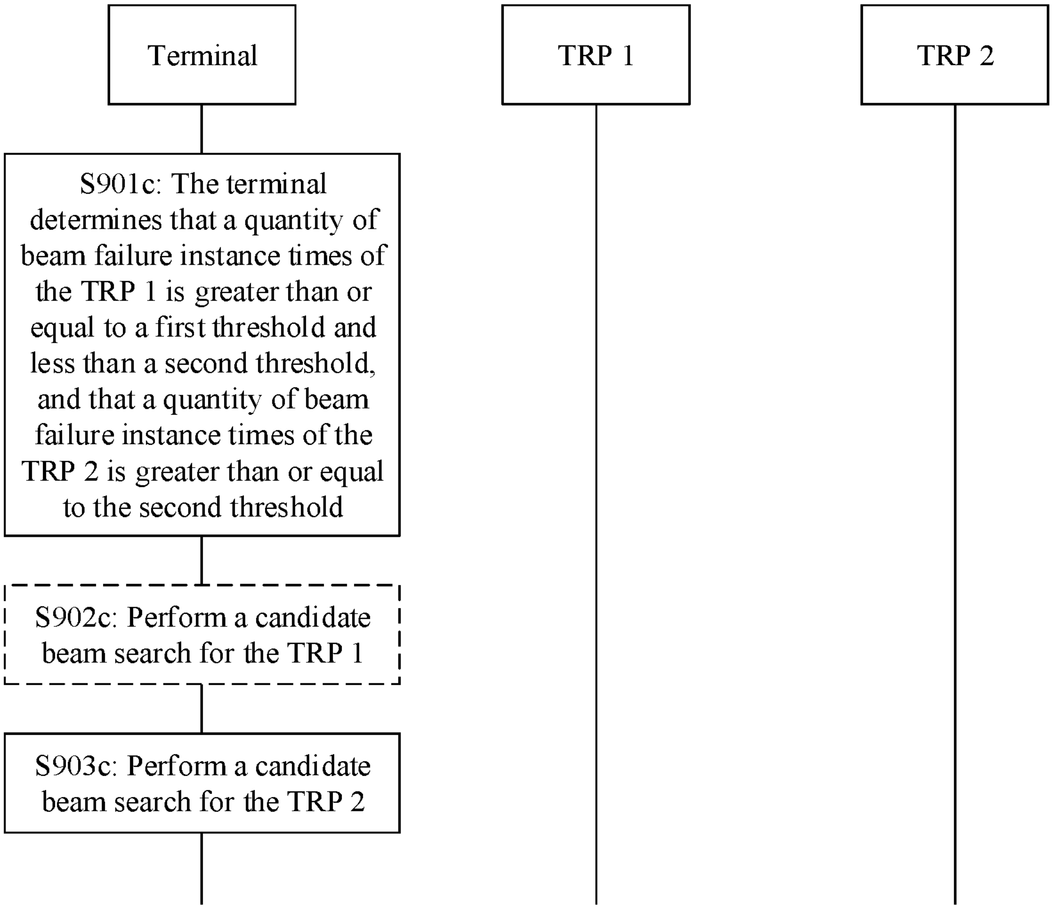
FIG. 9*c* is a flowchart of possible candidate beam searching according to an embodiment of this application.

As shown in FIG. 9*c*, in a possible implementation, in the TRPs that communicate with the terminal in the cell, when there is a TRP whose quantity of beam failure instance times is greater than or equal to the first threshold and less than the second threshold, and there is a TRP whose quantity of beam failure instance times is greater than or equal to the second threshold, that the terminal performs beam recovery on the TRP whose quantity of beam failure instance times is greater than or equal to the second threshold and optionally, performs beam recovery on the TRP whose quantity of beam failure instance times is greater than or equal to the first threshold and less than the second threshold includes the following steps.

S901*c*: The terminal determines that the quantity of beam failure instance times of the TRP 1 is greater than or equal to the first threshold and less than the second threshold, and that the quantity of beam failure instance times of the TRP 2 is greater than or equal to the second threshold.

S902*c*: Optionally, the terminal searches for a candidate beam for the TRP 1.

Optionally, the terminal searches for the candidate beam for the TRP 1, and adds beam recovery information of the TRP 1 to the beam recovery request MAC CE.

S903*c*: The terminal searches for a candidate beam for the TRP 2.

The terminal searches for the candidate beam for the TRP 2, and may send the beam recovery request MAC CE after completing candidate beam searching of the TRP 2.

The following provides the following possible implementations for the beam recovery request MAC CE in a scenario in which the cell in the foregoing embodiment may include a plurality of TRPs.

In a possible implementation, it may be agreed in a protocol that for one cell in the beam recovery request MAC CE, a presence of beam recovery information of an access network device on which beam recovery needs to be performed. As shown in FIG. 10, the MAC CE includes:

A C field is used to indicate information about the cell in which beam recovery needs to be performed and that is in the beam recovery request MAC CE.

In a possible implementation, the C field occupies 8 bits. For example, the C field includes 8 bits C0 to C7, each bit corresponds to one cell, for example, by using an index of the cell, and a cell whose index is 1 corresponds to C1. For each bit, if the bit is 1, it indicates that for a cell corresponding to the bit, in the beam recovery request MAC CE, a presence of beam recovery information of an access network device on which beam recovery needs to be performed; or if the bit is 0, it indicates that for a cell corresponding to the bit, in the beam recovery request MAC CE, beam recovery information of an access network device on which beam recovery needs to be performed is not present.

In this embodiment, an example in which the C field occupies 8 bits is used for description, and a quantity of bits occupied by the C field is not limited. The quantity of bits occupied by the C field may be agreed in the protocol based on an index range of cells that need to be indicated by the terminal or a maximum quantity of cells that can be connected to the terminal. For example, if an index range of the cells that need to be indicated by the terminal is 0 to 7, or a maximum quantity of cells that can be connected to the terminal is 8, it may be agreed that the C field occupies 8 bits. For another example, if an index range of cells that need to be indicated by the terminal is 0 to 31, or a maximum quantity of cells that can be connected to the terminal is 32, it may be agreed that the C field occupies 32 bits.

In a possible implementation, C0 may also be specially specified as an SP field, and correspond to a SpCell, to indicate whether the beam recovery request MAC CE includes beam recovery information of an access network device in the SpCell.

If an $i^{th}$ bit Ci=1 in the C field, the beam recovery request MAC CE correspondingly includes one TRP beam recovery information unit, used to indicate beam recovery information of a corresponding TRP. It should be noted that, it may also be agreed in the protocol that, in a random access process, if the beam recovery request MAC CE is used to indicate that a TRP in a SpCell needs to perform beam recovery, the MAC CE may not include a TRP beam recovery information unit in the SpCell.

TRP beam recovery information units in the beam recovery request MAC CE are arranged based on locations corresponding to corresponding cells in the C field, so that a network device may correspond the TRP beam recovery information units to the cells when reading content of the beam recovery request MAC CE.

The TRP beam recovery information unit includes at least:

An AC field is used to indicate whether the terminal finds a candidate beam for a corresponding TRP.

The AC field occupies 1 bit; and when the AC field is 1, it indicates that the terminal finds a candidate beam for a corresponding TRP; or when the AC field is 0, it indicates that the terminal does not find a candidate beam for a corresponding TRP.

A candidate beam field is used to indicate candidate beam information.

The terminal reports, by using the candidate beam field, an available beam found by the network device, for example, the beam may be indicated by using an index, of a reference signal of the candidate beam, configured by the network device.

In a possible implementation, when the AC field is 0, it indicates that the terminal does not find the candidate beam for the corresponding TRP, and indication information of the candidate beam field is meaningless. For example, all bits in the candidate beam field may be 0. When the AC field is 1, it indicates that the terminal finds the candidate beam for the corresponding TRP, and the candidate beam field includes information indicating candidate beam related information.

In this method embodiment, an example in which the candidate beam field occupies six bits is used for description, and a quantity of bits occupied by the candidate beam field is not limited. A length of the candidate beam field may be agreed on in the protocol based on a maximum quantity of indexes of beam information or an index range of beam information that needs to be indicated. For example, if an index range of candidate beams that need to be indicated is 0 to 63, or a maximum quantity of candidate beam indexes is 64, it may be agreed in the protocol that the candidate beam field occupies six bits.

A TI field is used to indicate information about a corresponding TRP.

In a possible implementation, the TI field occupies one bit, and may indicate two TRPs in a cell.

In this method embodiment and subsequent embodiments, only that the TI field occupies one bit is used as an example. A quantity of bits occupied by the TI field may be agreed on based on an index range of TRPs in a cell allowed in the protocol or a maximum quantity of TRPs, and is not limited. For example, if an index range of TRPs in a cell is 0 to 7, or a maximum quantity of TRPs is 8, the TI field may occupy three bits.

In this method embodiment, content in the TI field may be an index of a TRP configured and specified by the network device, or may use other information that can indicate the index of the TRP, for example, may be CORESETPoolIndex.

It should be noted that when beam failures occur on a plurality of TRPs in a same cell, the terminal may send a plurality of beam recovery requests MAC CEs shown in FIG. 11, to report beam recovery related information of different TRPs in the same cell.

According to the foregoing embodiment, in a scenario in which the cell includes the plurality of TRPs, the beam recovery request MAC CE may indicate beam recovery information of a TRP on which a beam failure occurs.

In a possible implementation, an N field may be used to indicate a quantity of TRPs on which beam recovery needs to be performed in the cell and that are in the beam recovery request MAC CE, and the beam recovery information of the plurality of TRPs on which beam recovery needs to be performed in the cell is indicated in the beam recovery request MAC CE. As shown in FIG. 11, the beam recovery request MAC CE includes:

A C field, for details, refer to content related to the C field in the embodiment shown in FIG. 10.

The N field is used to indicate a quantity of TRP beam recovery information units of the cell in which beam recovery needs to be performed in the beam recovery request MAC CE.

In this embodiment, the C field occupies 8 bits, and may indicate a maximum of eight cells. Correspondingly, the N field includes eight pieces of quantity indication information, and indicates a quantity of TRP beam recovery information units in each cell. In a possible implementation, the quantity of TRP beam recovery information units may be a value of the quantity indication information in the N field plus 1. For example, the terminal is connected to a maximum of two TRPs in one cell; the quantity indication information needs to occupy 1 bit; and a value 0 indicates that the quantity is 1; or a value 1 indicates that the quantity is 2. Therefore, in this embodiment, the N field occupies 8 bits in total.

A quantity of bits occupied by the N field is related to a quantity of bits occupied by the C field and a maximum quantity of TRPs that can be connected to the terminal in the cell. In the protocol, the quantity of bits occupied by the N field may be agreed on based on a maximum quantity of cells that can be connected to the terminal and the maximum quantity of TRPs that can be connected to the terminal in the cell, and a quantity of bits occupied by each piece of quantity indication information in the N field may be agreed on. For example, if it is agreed in the protocol that the terminal may be connected to a maximum of 16 cells, and each cell may be connected to a maximum of four TRPs, it may be agreed that the N field includes 16 pieces of quantity indication information, each piece of quantity indication information occupies 2 bits, and the N field occupies 32 bits in total.

In a possible implementation, if an $i^{th}$ bit Ci in the C field is 1, and an $i^{th}$ piece of quantity indication information in the corresponding N field is Ni, the MAC CE includes (Ni+1) TRP beam recovery information units. It should be noted that, optionally, in a random access process, Ni corresponding to a SpCell cell in the MAC CE may be 0, and the MAC CE does not include a TRP beam recovery information unit in the SpCell.

For the TRP beam recovery information unit, refer to content of the TRP beam recovery information unit in the embodiment shown in FIG. 10. Details are not described again.

The TRP beam recovery information units are first arranged in a sequence of corresponding cell indexes, so that when the beam recovery request MAC CE is parsed, a quantity of TRP beam recovery information units in each cell can be obtained based on indication information of the C field and the N field, and the TRP beam recovery information units correspond to the cells. Optionally, TRP beam recovery information units in a same cell may be arranged in a sequence of TRP indexes. In a possible implementation, if the beam recovery request MAC CE includes TRP beam recovery information units of all TRPs in the cell, the beam recovery information units in the cell may be arranged in a sequence of TRP indexes, so that the network device may correspond the TRP beam recovery information units to TRP devices in a sequence of the TRP beam recovery information units. In this case, the beam recovery information units may not have the TI field to indicate TRP index information.

In the foregoing embodiment, one beam recovery request MAC CE may indicate beam recovery related information of the plurality of TRPs on which beam failures occur in one cell. This reduces overheads for sending the beam recovery request MAC CE.

Figure 12:
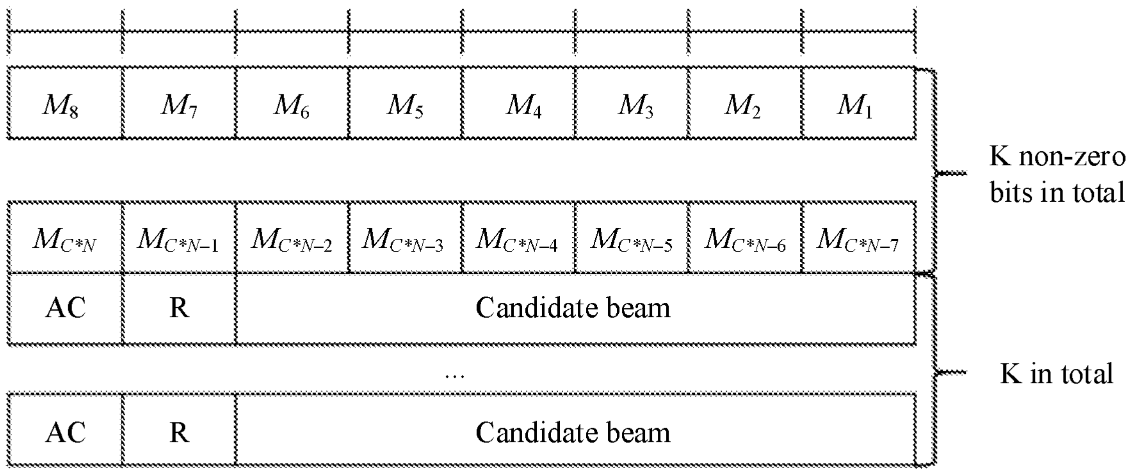
FIG. 12 is a schematic diagram of a possible beam recovery request MAC CE according to an embodiment of this application.

In a possible implementation, the beam recovery request MAC CE may indicate whether each device connected to the terminal needs to perform beam recovery. As shown in FIG. 12, the beam recovery request MAC CE includes:

An M field is used to indicate a TRP on which beam recovery needs to be performed.

The M field is a bitmap. In a possible implementation, a quantity of bits occupied by the M field is C*N, where C is a maximum quantity of cells that can be connected to the terminal, and N is a maximum quantity of TRPs that can be connected to the terminal in each cell. In another possible implementation method, a quantity of bits in the M field is a sum of quantities of TRPs in all cells that are connected to the terminal.

When an $i^{th}$ bit Mi in the M field is 1, it indicates that the beam recovery request MAC CE includes a beam recovery request of a TRP whose index is i; or if Mi is 0, it indicates that the beam recovery request MAC CE does not include a beam recovery request of a TRP whose index is i. The index of the TRP may be obtained by the network device by configuring indexes of all TRPs, or may be obtained based on a cell index and the index of the TRP in a cell.

For each bit whose value is 1 in the M field, the beam recovery request MAC CE includes a corresponding TRP beam recovery information unit. For example, if the M field includes K bits whose value is 1, and K is an integer greater than or equal to 1, the M field in the beam recovery request MAC CE includes K TRP beam recovery information units. In a possible implementation, in a random access process, the bit Mi corresponding to a SpCell in the MAC CE in this embodiment is set to 1. Optionally, the M field may not include a TRP beam recovery information unit of the TRP in the SpCell.

The TRP beam recovery information unit includes:

An AC field, for details, refer to content related to the AC field in FIG. 10. Details are not described again.

A candidate beam field, for details, refer to content related to the candidate beam field in FIG. 10. Details are not described again.

According to the foregoing method, a TRP on which a beam failure occurs and candidate beam searching is completed can be directly indicated. This reduces overheads of parsing the MAC CE by the network device.

Figure 13:
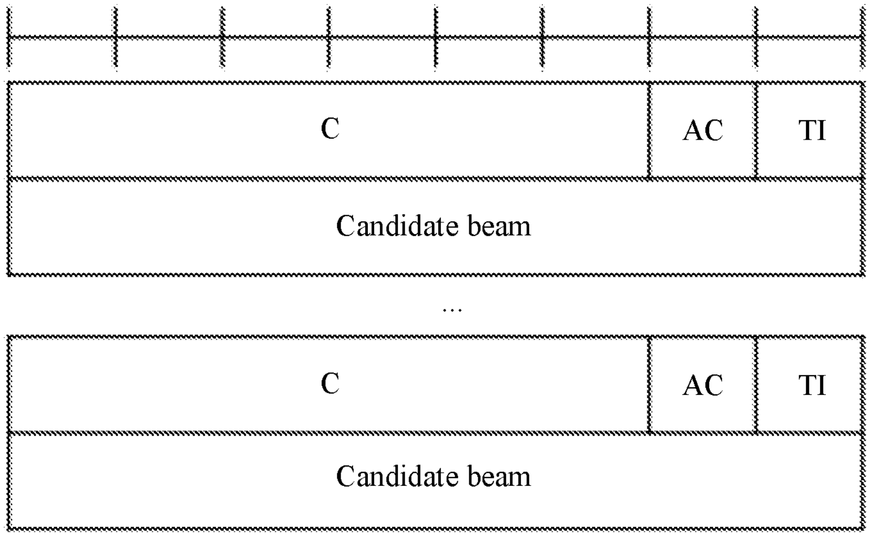
FIG. 13 is a schematic diagram of a possible beam recovery request MAC CE according to an embodiment of this application.

In a possible implementation, the beam recovery request MAC CE may include a plurality of cell beam recovery information units, and each cell beam recovery information unit indicates a TRP, in a corresponding cell, on which beam recovery needs to be performed. As shown in FIG. 13, the MAC CE includes:

The beam recovery request MAC CE includes one or more cell beam recovery information units, and the cell beam recovery information unit indicates beam recovery information of a TRP, in a cell, on which beam recovery needs to be performed. It may be understood that if there are TRPs, in a plurality of cells, on which beam recovery needs to be performed, the beam recovery request MAC CE includes the plurality of cell beam recovery information units.

The cell beam recovery information unit includes:

A C field is used to indicate cell information corresponding to the cell beam recovery information unit.

An index of a cell is in the C field. In this embodiment, the C field occupies 6 bits, a value range is 0 to 63, and may indicate 64 cells. It should be noted that a quantity of bits occupied by the C field is not limited in this embodiment, and the quantity of bits occupied by the C field may be agreed in the protocol based on a maximum quantity of cells that can be connected to the terminal or an index range of cells. For example, if it is agreed in the protocol that the maximum quantity of cells that can be connected to the terminal is 8, or the corresponding index range of the cells is 0 to 7, it may be agreed that the C field occupies 3 bits. For another example, if it is agreed in the protocol that the maximum quantity of cells that can be connected to the terminal is 32, or the corresponding index range of the cells is 0 to 31, it may be agreed that the C field occupies 5 bits.

The cell beam recovery information unit further includes a TRP beam recovery information unit. For details, refer to content of the TRP beam recovery information unit in the embodiment shown in FIG. 10. Details are not described again. Optionally, if a cell indicated in the C field is a SpCell, and the beam recovery request MAC CE is used for a random access process, the cell beam recovery information unit may not include beam recovery information of the TRP.

According to the MAC CE in the foregoing embodiment, if the beam failures occur on the plurality of TRPs in the same cell, the plurality of cell beam recovery information units with the same C field may be sent in the MAC CE, so that beam recovery information of the plurality of TRPs, in the same cell, on which beam failures occur is indicated in the MAC CE. This reduces resources occupied by the MAC CE.

Figure 14:
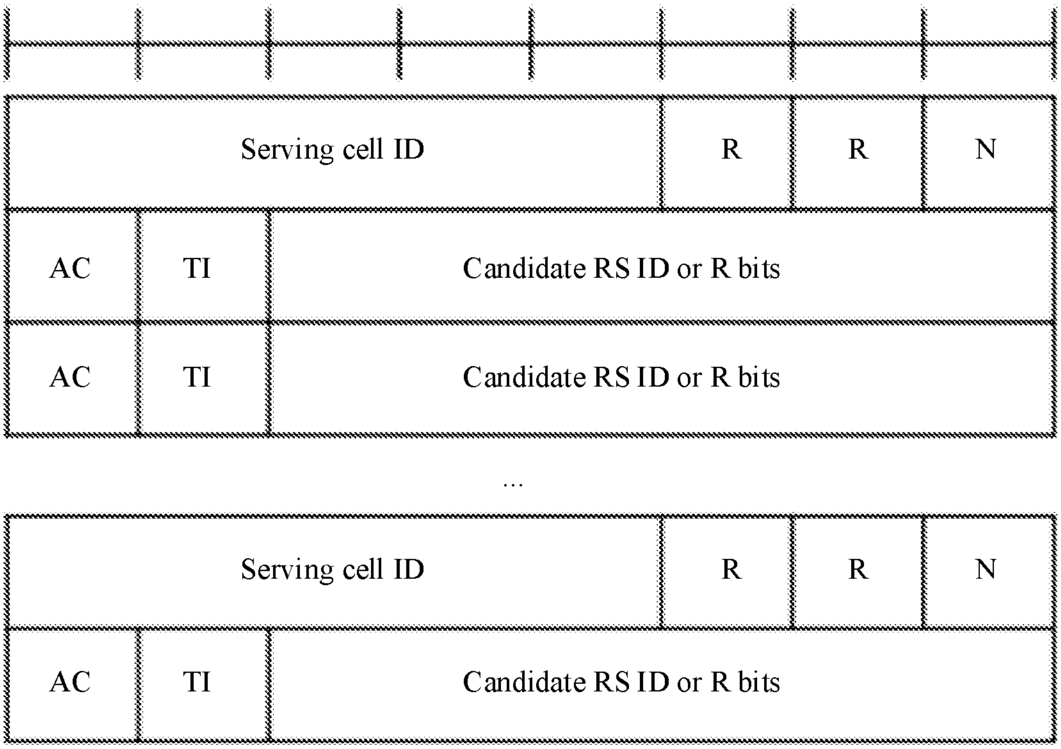
FIG. 14 is a schematic diagram of a possible beam recovery request MAC CE according to an embodiment of this application.

In a possible implementation, the beam recovery request MAC CE may include a plurality of cell beam recovery information units, and each cell beam recovery information unit includes an N field that may indicate a quantity of TRP beam recovery information units in the cell beam recovery information unit. As shown in FIG. 14, the MAC CE includes:

The MAC CE includes one or more cell beam recovery information units, and the cell beam recovery information unit may indicate beam recovery related information of at least one TRP on which a beam failure occurs in a cell in which the beam failure occurs and a candidate beam searching process is completed. The cell beam recovery information unit includes:

A C field, for details, refer to content related to the C field in the embodiment shown in FIG. 13. Details are not described herein again.

The N field is used to indicate the quantity of TRP beam recovery information units in the corresponding cell beam recovery information unit.

The quantity of TRP beam recovery information units indicated by the N field is the N field plus 1. For example, when the N field is K, and K is an integer greater than or equal to 0, the cell beam recovery information unit includes K+1 TRP beam recovery information units. It should be noted that values of N fields in different cell beam recovery information units may be different.

In this embodiment, the N field occupies one bit. Therefore, the cell beam recovery information unit includes a maximum of two TRP beam recovery information units, where when the N field is "0", it indicates that one TRP beam recovery information unit is included, or when the N field is "1", it indicates that two TRP beam recovery information units are included. It should be noted that in this method embodiment, an example in which the N field occupies 1 bit is used for description, and a quantity of bits occupied by the N field is not limited. The quantity of bits occupied by the N field may be agreed in the protocol based on a maximum quantity of TRPs that can be connected to the terminal in the cell or an index range of the TRP. For example, a maximum quantity of TRPs in the cell is 8, or when an index range of the TRPs is 0 to 7, the N field occupies 3 bits.

The cell beam recovery information unit further includes the TRP beam recovery information units in the quantity indicated by the N field. It should be noted that, optionally, in a random access process, an N field of a cell beam recovery information unit in a SpCell in the beam recovery information MAC CE in this embodiment is meaningless, and does not include a TRP beam recovery information unit.

For the TRP beam recovery information unit, refer to content of the TRP beam recovery information unit in the embodiment shown in FIG. 13. Details are not described again.

In a possible implementation, optionally, if the quantity of TRP beam recovery information units indicated by the N field in the cell beam recovery information unit is the same as the quantity of TRPs that are connected to the terminal in the corresponding cell, in the cell beam recovery information unit, the TRP beam recovery information units may be arranged in a sequence of indexes of the TRPs, and the network device may correspond the TRPs to the TRP beam recovery information units based on the sequence, where the TRP beam recovery information unit does not include the TI field.

In the foregoing embodiment, each cell beam recovery information unit in the beam recovery request MAC CE may indicate information about the plurality of TRPs on which beam recovery needs to be performed. This can reduce overheads of the MAC CE.

Figure 15:
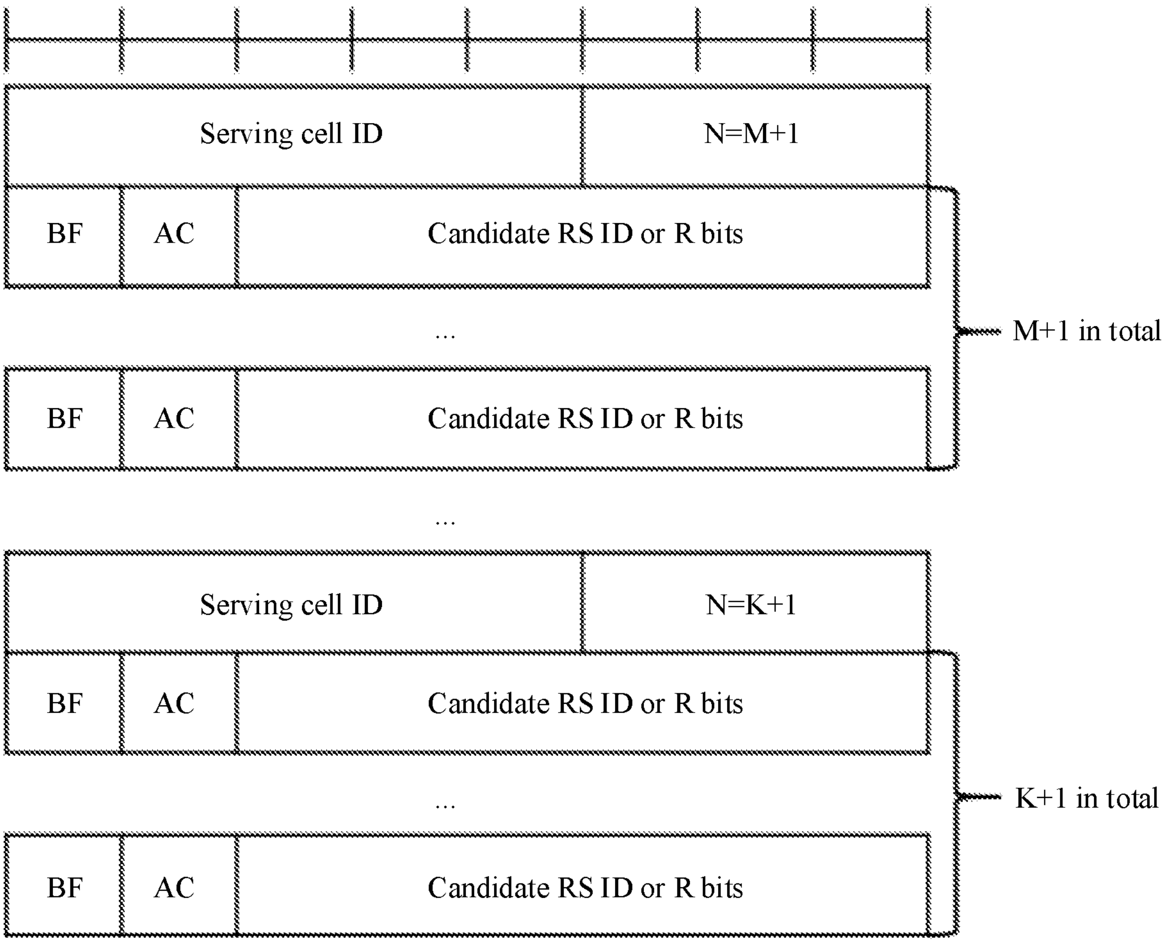
FIG. 15 is a schematic diagram of a possible beam recovery request MAC CE according to an embodiment of this application.

In a possible implementation, the beam recovery request MAC CE may include a plurality of cell beam recovery information units, and each cell beam recovery information unit includes beam recovery information of all the TRPs. As shown in FIG. 15, the MAC CE includes:

The beam recovery request MAC CE includes one or more cell beam recovery information units, and the cell beam recovery information unit includes beam recovery information of all the TRPs in the cell. The cell beam recovery information unit includes:

A C field, for details, refer to content related to the C field in the embodiment shown in FIG. 13. Details are not described herein again.

An N field, for details, refer to content related to the N field in the embodiment shown in FIG. 14.

It should be noted that in this embodiment, the N field indicates a total quantity of TRPs that are connected to the terminal in the cell corresponding to the cell beam recovery information unit. This field is related to the quantity of TRPs that are connected to the terminal. For example, if a quantity of TRPs that are connected to the terminal in the cell is M+1, where M is an integer greater than or equal to 0, the N field is M, and a quantity of TRP beam recovery information units in the cell beam recovery information unit is M+1. It should be noted that, in a random access process, in a cell beam recovery information unit corresponding to a SpCell in the beam recovery request MAC CE in this embodiment, optionally, the N field is set to 0, and the cell beam recovery information unit does not include a TRP beam recovery information unit. It should be noted that N fields in cell beam recovery information units in different cells may be different. For example, an N field in one cell beam recovery information unit is M, and an N field in another cell beam recovery information unit is K, where M and K are integers greater than or equal to 0.

In this embodiment, the TRP beam recovery information unit includes:

A BF field is used to indicate whether a TRP corresponding to the corresponding TRP beam recovery information unit reports beam recovery information.

In a possible implementation, the BF field occupies 1 bit. When the BF field is 0, it indicates that the corresponding TRP does not report the beam recovery information, and information in an AC field and a candidate beam field in the TRP beam recovery information unit may be invalid. When the BF field is 1, it indicates that the corresponding TRP reports the beam recovery information, and information in an AC field and a candidate beam field is valid.

The AC field, for details, refer to content related to the AC field in FIG. 10. Details are not described again.

The candidate beam field, for details, refer to content related to the candidate beam field in FIG. 10. Details are not described again.

In the foregoing embodiment, for the MAC CE that does not need to indicate information of a device, when parsing the MAC CE, the network device may obtain the beam recovery information of the corresponding TRPs based on a sequence of the TRP beam recovery information units. This reduces processing overheads.

It should be noted that, in embodiments shown in FIG. 10 to FIG. 15, a reserved field R may be added to the MAC CE based on a requirement, so that a quantity of bits occupied by information in the MAC CE is an integer multiple of 8. For example, in the embodiment shown in FIG. 14, because the C field and the N field are 6 bits in total, a 2-bit R field may be added to the byte.

It may be understood that beam recovery request information of a plurality of cells may be indicated in one beam recovery request MAC CE. For beam recovery information of each cell, refer to the method implementation in FIG. 10 to FIG. 15. Details are not described again.

In addition, it may be understood that the beam recovery request MAC CEs in the foregoing embodiments may be combined with each other. For example, it may be agreed in the protocol that different formats are used based on an actual situation of the beam recovery information, and the MAC CEs are distinguished by using a MAC layer logical channel indication.

Figure 16:
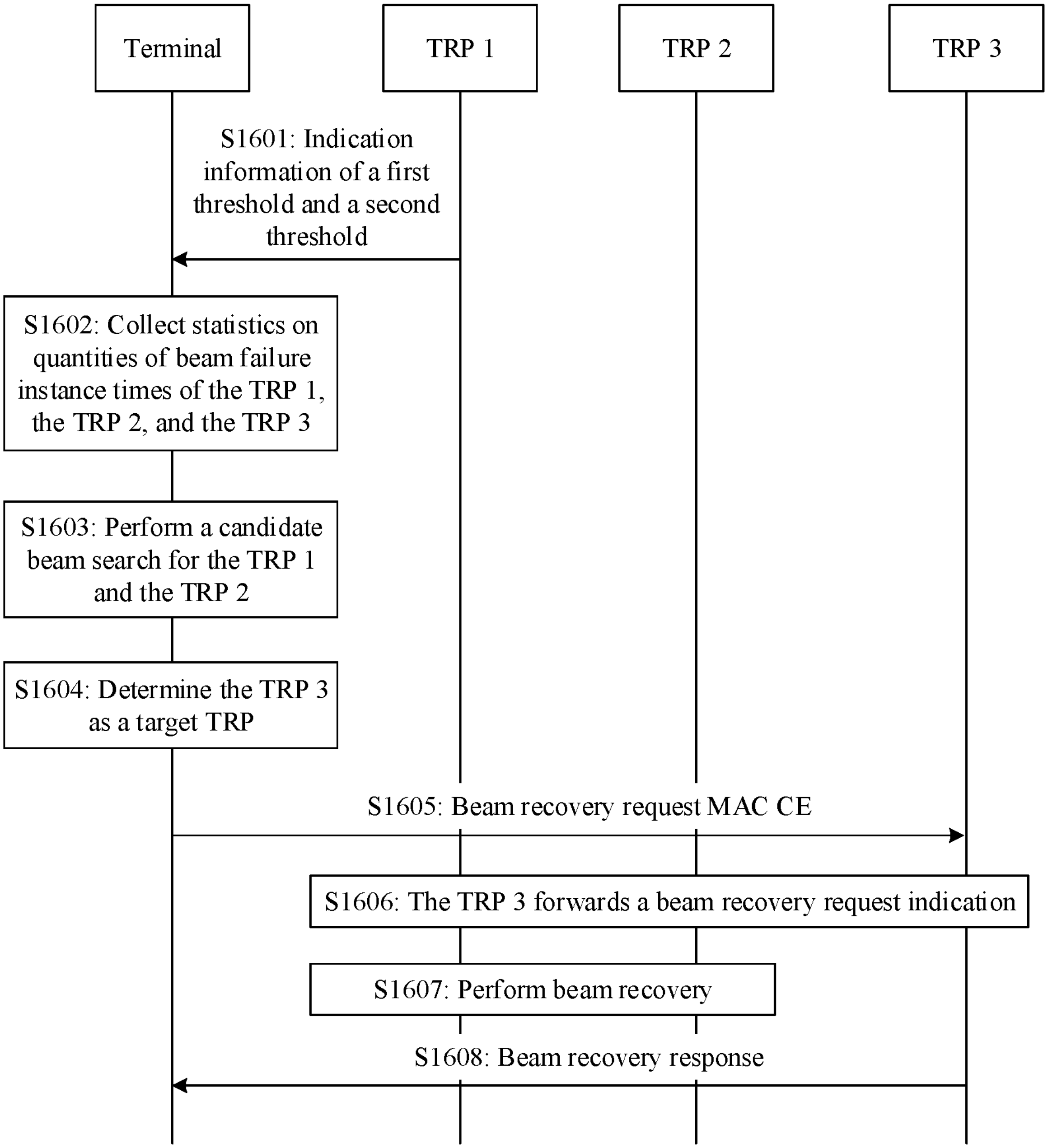
FIG. 16 is a flowchart of a possible implementation according to an embodiment of this application.

Based on the foregoing embodiment, as shown in FIG. 16, a possible implementation method is provided. The method includes the following steps.

S1601: A terminal receives indication information of a first threshold and a second threshold.

The terminal communicates with a TRP 1, a TRP 2, and a TRP 3 based on beams. The TRP 1, the TRP 2, and the TRP 3 belong to a same cell, and an ID of the cell is 1.

The terminal receives the indication information of the first threshold and the second threshold from the TRP 1, where the indication information is carried by using RRC signaling. A network side indicates that an index of the first threshold is "01", and an index of the second threshold is "02". After receiving the indication information, the terminal may obtain the first threshold 4 and the second threshold 8 according to Table 1.

S1602: The terminal collects statistics on quantities of beam failure instance times of the TRP 1, the TRP 2, and the TRP 3.

The terminal collects statistics on the quantity of beam failure instance times of the TRP 1 by using a first beam failure instance counter and a first beam failure detection timer, collects statistics on the quantity of beam failure instance times of the TRP 2 by using a second beam failure instance counter and a second beam failure detection timer, and collects statistics on the quantity of beam failure instance times of the TRP 3 by using a third beam failure instance counter and a third beam failure detection timer.

S1603: The terminal searches for candidate beams for the TRP 1 and the TRP 2.

The terminal side determines, when a value of the first beam failure instance counter is greater than or equal to the second threshold, a beam status of the TRP 1 is a beam failure; when a value of the second beam failure instance counter is greater than or equal to the first threshold and less than the second threshold, a beam status of the TRP 2 is a beam pre-failure; and when a value of the third beam failure instance counter is less than the first threshold, a beam status of the TRP 3 is beam normal.

The terminal searches for the candidate beams for the TRP 1 and the TRP 2 based on the beam statuses of the TRP 1, the TRP 2, and the TRP 3. A candidate beam RS ID of the TRP 1 is 1, and a candidate beam RS ID of the TRP 2 is 3.

S1604: The terminal determines the TRP 3 as a target TRP.

The terminal compares CSI-RS RSRP of the TRP 1, the TRP 2, and the TRP 3, and determines that CSI-RS RSRP of the TRP 3 is the largest, or the terminal selects, based on that the beam status of the TRP 3 is the beam normal, the TRP 3 as the target TRP for sending a beam recovery request MAC CE.

S1605: The terminal sends the beam recovery request MAC CE to the TRP 3.

The terminal device obtains, based on a CORESETPoolIndex corresponding to the TRP 3, CORESET corresponding to the TRP 3, detects a PDCCH in the CORESET resource, and sends the beam recovery request MAC CE by using an uplink resource indicated in uplink grant information on the PDCCH, where the MAC CE carries beam recovery information of the TRP 1 and the TRP 2.

In a possible implementation, for example, based on the embodiment shown in FIG. 14, the beam recovery request MAC CE is shown in FIG. 17.

Because the beam recovery request MAC CE relates to only one cell, only one cell beam recovery information unit is included.

It is agreed in a protocol that a first byte of the cell beam recovery information unit includes a C field, an R field, and an N field. The C field occupies 5 bits, and a value range of the C field is 0 to 31. Therefore, the C field may indicate a maximum of 32 cells that are connected to the terminal. The N field occupies 2 bits, and a value range of the N field is 0 to 3, and may indicate that the cell beam recovery information unit includes 1 to 4 TRP beam recovery information units. Because the C field and the N field occupy 7 bits in total, to facilitate parsing of the MAC CE, a 1-bit R field is set between the C field and the N field.

The first byte is "00001001", which is specifically described as follows:

The ID of the cell of the TRP 1 and the TRP 2 is 1. Therefore, "00001" is filled in the C field.

Because the TRP 1 and the TRP 2 need to perform beam recovery, there are two TRP beam recovery information units, and "01" is filled in the N field.

"0" is filled in the R field.

It is agreed in the protocol that a second byte in the cell beam recovery information unit starts with a TRP beam recovery information unit, and the TRP beam recovery information unit occupies 8 bits, and includes an AC field, a TI field, and a candidate RS ID field. The AC field occupies 1 bit, a first value "1" indicates that a candidate beam is found, and a second value "0" indicates that no candidate beam is found. The TI field occupies 2 bits, and a value range is 0 to 3. Therefore, a maximum of four TRPs can be indicated. The candidate RS ID field occupies 5 bits, and a value range is 0 to 31. Therefore, a maximum of 32 candidate beams can be indicated.

The second byte is "10000001", which is specifically described as follows:

A TRP corresponding to the TRP beam recovery information unit finds the candidate beam. Therefore, "1" is filled in the AC field.

The TRP corresponding to the TRP beam recovery information unit is the TRP 1, and an ID of the TRP 1 is 0. Therefore, "00" is filled in the TM field.

An ID index of the candidate beam found by the TRP 1 is 1. Therefore, "00001" is filled in the candidate RS ID field.

A third byte is "10100011", which is specifically described as follows:

A TRP corresponding to a TRP beam recovery information unit finds a candidate beam. Therefore, "1" is filled in an AC field.

The TRP corresponding to the TRP beam recovery information unit is the TRP 2, and an ID of the TRP 2 is 1. Therefore, "01" is filled in a TM field.

An ID index of the candidate beam found by the TRP 2 is 3. Therefore, "00011" is filled in a candidate RS ID field.

In another possible implementation, for example, based on the embodiment shown in FIG. 11, the MAC CE is shown in FIG. 18.

It is agreed in a protocol that a first byte of the beam recovery request MAC CE is a C field. The C field occupies 8 bits, and includes 8 bits C0 to C7. Therefore, a maximum of eight cells can be indicated.

The first byte is "00000010", which is specifically described as follows:

Only the TRPs in the cell corresponding to TRP 1 and TRP 2 need to perform beam recovery, and the cell ID is 1. Therefore, "1" is filled in C1, and "0" is filled in other bits.

It is agreed in the protocol that a second byte and a third byte of the beam recovery request MAC CE each are an N field. The N field occupies 16 bits, and includes N0 to N7, which respectively correspond to C0 to C7. N0 to N7 each occupy 2 bits, and a value range is 0 to 3. It may indicate that the MAC CE includes a maximum of four TRP beam recovery information units in a corresponding cell.

The second byte is "00000100" and the third byte is "00000000", which are specifically described as follows:

Only the TRPs in the cell corresponding to the TRP 1 and the TRP 2 need to perform beam recovery, the cell ID is 1, and a quantity of TRPs is 2. Therefore, "01" is filled in Ni. Because C0, and C2 to C7 are "0", it may indicate that corresponding cells have no TRP beam recovery information unit, and "00" is filled in N0 and N2 to N7.

It is agreed in the protocol that, starting from the fourth byte, a subsequent byte is a TRP beam recovery information unit, and each TRP beam recovery information unit occupies 8 bits, and includes an AC field, a TI field, and a candidate RS ID field. A quantity of TRP beam recovery information units is a sum of a quantity of TRP beam recovery information units indicated in the N field, and therefore two TRP beam recovery information units are included in this embodiment.

For description of the third byte, refer to the second byte in the MAC CE shown in FIG. 17. For description of the fourth byte, refer to content of the third byte in the MAC CE shown in FIG. 17. Details are not described again.

S1606: The TRP 3 receives the beam recovery request MAC CE, and forwards beam recovery information.

The TRP 3 receives the beam recovery request MAC CE, and forwards indication information in the beam recovery request to the TRP 1 and the TRP 2 by using an ideal backhaul or a non-ideal backhaul.

S1607: The TRP 1 and the TRP 2 perform beam recovery.

The TRP 1 and the TRP 2 separately receive indication in the beam recovery request, and perform beam recovery.

S1608: The terminal receives a beam recovery response from the TRP 3.

The TRP 3 sends an uplink grant to the terminal, where a HARQ process in the uplink grant is the same as a HARQ process used by the terminal to send the beam recovery request MAC CE, and the uplink grant indicates new transmission. After receiving the uplink grant, the terminal determines that beam recovery is completed, and clears the first beam failure instance counter and the second beam failure instance counter.

Figure 19:
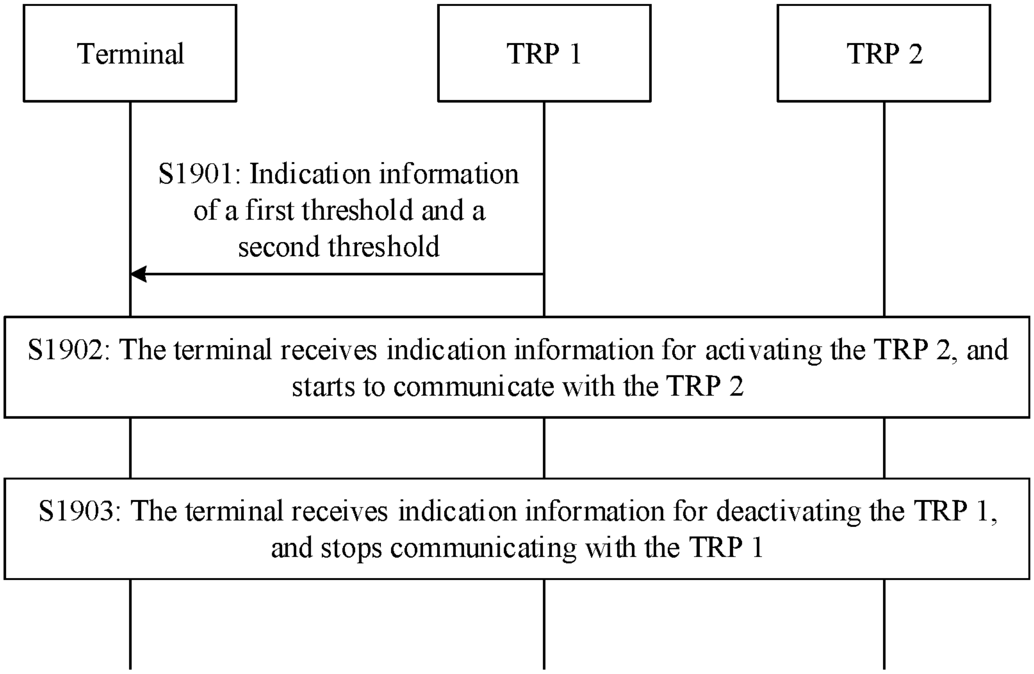
FIG. 19 is a flowchart of a possible implementation according to an embodiment of this application.

An overall procedure of beam recovery is described in detail in the foregoing method. The following, as shown in FIG. 19, provides a TRP control method, which may be combined with the foregoing embodiments and includes the following steps.

S1901: A terminal receives indication information of a first threshold and a second threshold.

The terminal performs data communication with a TRP 1 based on a beam.

The terminal receives the indication information of the first threshold and the second threshold, and collects statistics on a quantity of beam failure instance times of the TRP 1 by using a first beam failure instance counter and a first beam failure detection timer. The terminal performs beam recovery on the TRP when the quantity of beam failure instance times of the TRP is greater than or equal to the first threshold and less than the second threshold, or when the quantity of beam failure instance times is greater than or equal to the second threshold. For details, refer to related content in the foregoing embodiment. Details are not described again.

Optionally, the terminal may receive the indication information by using the TRP 1, where the indication information includes information indicating a time domain resource and a frequency domain resource for monitoring a PDCCH of a TRP 2. The indication information may be carried in at least one of the following content: RRC signaling, DCI, or a MAC CE.

S1902: The terminal receives indication information for activating the TRP 2, and starts to communicate with the TRP 2.

The terminal receives, by using the TRP 1, the indication information for activating the TRP 2. Optionally, the indication information for activating the TRP 2 may include the information indicating the time domain resource and the frequency domain resource for monitoring the PDCCH of the TRP 2. The indication information for activating the TRP 2 may be carried in at least one of the following content: RRC signaling, DCI, or a MAC CE.

The terminal monitors the PDCCH of the TRP 2 based on the information about the time domain resource and the frequency domain resource of the PDCCH of the TRP 2. Therefore, the terminal device may perform data communication with the TRP 1 and the TRP 2 based on beams.

The terminal starts to collect statistics on a quantity of beam failure instance times of the TRP 2 by using a second beam failure instance counter and a second beam failure detection timer.

S1903: The terminal receives indication information for deactivating the TRP 1, and stops communicating with the TRP 1.

The terminal receives the indication information for deactivating the TRP 1, where the indication information for deactivating the TRP 1 includes information indicating to deactivate the TRP 1. The terminal stops communicating with the TRP 1, and clears the first beam failure instance counter. The terminal stops monitoring a PDCCH on a time domain resource and a frequency domain resource of the PDCCH of the TRP 1, and stops sending an SRS, a PUCCH, an RACH, and a CSI report to the TRP 1. A network device stops sending the PDCCH to the terminal by using the time domain resource and the frequency domain resource of the PDCCH of the TRP 1. Optionally, the network side and the terminal reserve the time domain resource and the frequency domain resource of the PDCCH the TRP 1, and may continue to use the resources after the TRP 1 is reactivated.

In a possible implementation, the network side collects statistics on a quantity of received times of beam recovery requests of the TRP 1. When the quantity of received times of the beam recovery requests of the TRP 1 is greater than or equal to a TRP deactivation quantity threshold, the network side may determine to deactivate the TRP 1, and send the indication for deactivating the TRP 1 to the terminal.

In a possible implementation, the network side may alternatively indicate, based on a service requirement, to deactivate the TRP 1. For example, when duration in which the TRP 1 does not perform data communication with the terminal is greater than or equal to a TRP deactivation duration threshold, the network side may determine to deactivate the TRP 1, and send the indication for deactivating the TRP 1 to the terminal.

Optionally, the indication information for deactivating the TRP 1 may further include indication information of deactivation duration of the TRP 1. After the terminal stops communicating with the TRP 1, the terminal reactivates the TRP 1 after time indicated by the deactivation duration indication, and the terminal starts to communicate with the TRP 1 again. The indication information of the deactivation duration may be a specific time length, or a range of duration agreed in a protocol, and the deactivation duration is indicated by using an index of the range.

The indication information for deactivating the TRP 1 may be sent by using the TRP 1 or the TRP 2, and the indication information for deactivating the TRP 1 may be carried in at least one of the following content: RRC signaling, DCI, or a MAC CE.

According to the foregoing implementation method, when a beam failure frequently occurs on a beam of a TRP, the network device may determine and deactivate the TRP. This improves an energy saving effect of UE.

It may be understood that, for detailed descriptions in specific procedures in the foregoing embodiments, refer to each other or a combination may be made. Details are not described herein again.

With reference to FIG. 6 to FIG. 19, the foregoing describes the communication method in embodiments of this application in detail. The following describes in detail communication apparatuses in embodiments of this application with reference to FIG. 20 to FIG. 22.

Figure 20:
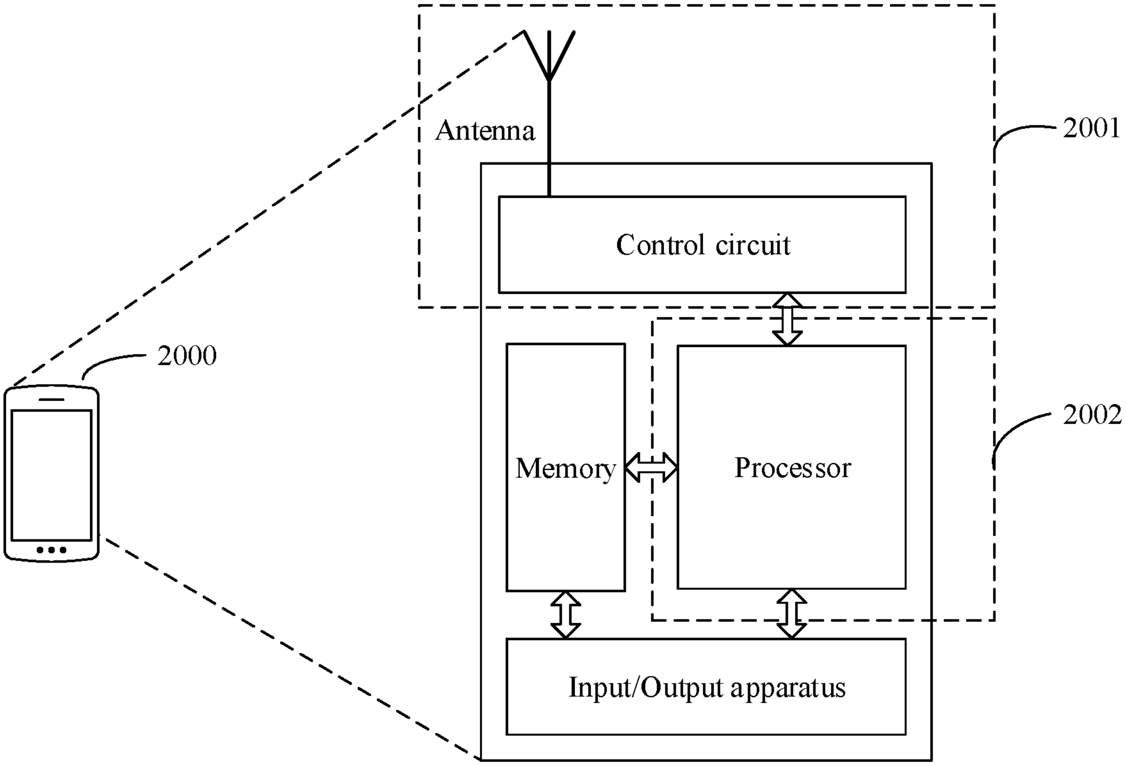
FIG. 20 is a schematic diagram of a structure of a terminal according to an embodiment of this application.

FIG. 20 is a schematic diagram of a structure of a terminal according to an embodiment of this application. The terminal can be used in the system shown in FIG. 1, to perform a function of the terminal in the foregoing method embodiments. For ease of description, FIG. 20 shows only main components of the terminal. As shown in FIG. 20, the terminal 2000 includes a processor, a memory, a control circuit, an antenna, and an input/output apparatus. The processor is mainly configured to: process a communication protocol and communication data, control the entire terminal, execute a software program, and process data of the software program, for example, is configured to support the terminal in performing the action described in the foregoing method embodiments. The memory is mainly configured to store the software program and data. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal is powered on, the processor can read the software program in the memory, interpret and execute instructions in the software program, and process data of the software program. When data needs to be sent in a wireless manner, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 20 shows only one memory and one processor. In an actual terminal, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal may include a baseband processor and a central processing unit. The baseband processor is mainly configured to process the communication protocol and the communication data. The central processing unit is mainly configured to: control the entire terminal, execute the software program, and process the data of the software program. Functions of the baseband processor and the central processing unit may be integrated into the processor in FIG. 20. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. All the components of the terminal may be connected through various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

In this embodiment of this application, the antenna having a transceiver function and the control circuit may be considered as a transceiver unit 2001 of the terminal 2000, for example, configured to support the terminal in performing a receiving function and a sending function. The processor 2002 having a processing function is considered as a processing unit 2002 of the terminal 2000. As shown in FIG. 20, the terminal 2000 includes the transceiver unit 2001 and the processing unit 2002. The transceiver unit may also be referred to as a transceiver machine, a transceiver, a transceiver apparatus, or the like. Optionally, a component that is in the transceiver unit 2001 and that is configured to implement a receiving function may be considered as a receiving unit, and a component that is in the transceiver unit 2001 and that is configured to implement a sending function may be considered as a sending unit. In other words, the transceiver unit 2001 includes a receiving unit and a sending unit. The receiving unit may also be referred to as a receiver, an input port, a receive circuit, or the like. The sending unit may also be referred to as a transmitter, a transmitter machine, a transmit circuit, or the like.

The processor 2002 may be configured to execute the instructions stored in the memory, to control the transceiver unit 2001 to receive a signal and/or send a signal, to complete functions of the terminal in the foregoing method embodiments. The processor 2002 further includes an interface, configured to implement a signal input/output function. In an implementation, a function of the transceiver unit 2001 may be implemented by using a transceiver circuit or a dedicated transceiver chip.

Figure 21:
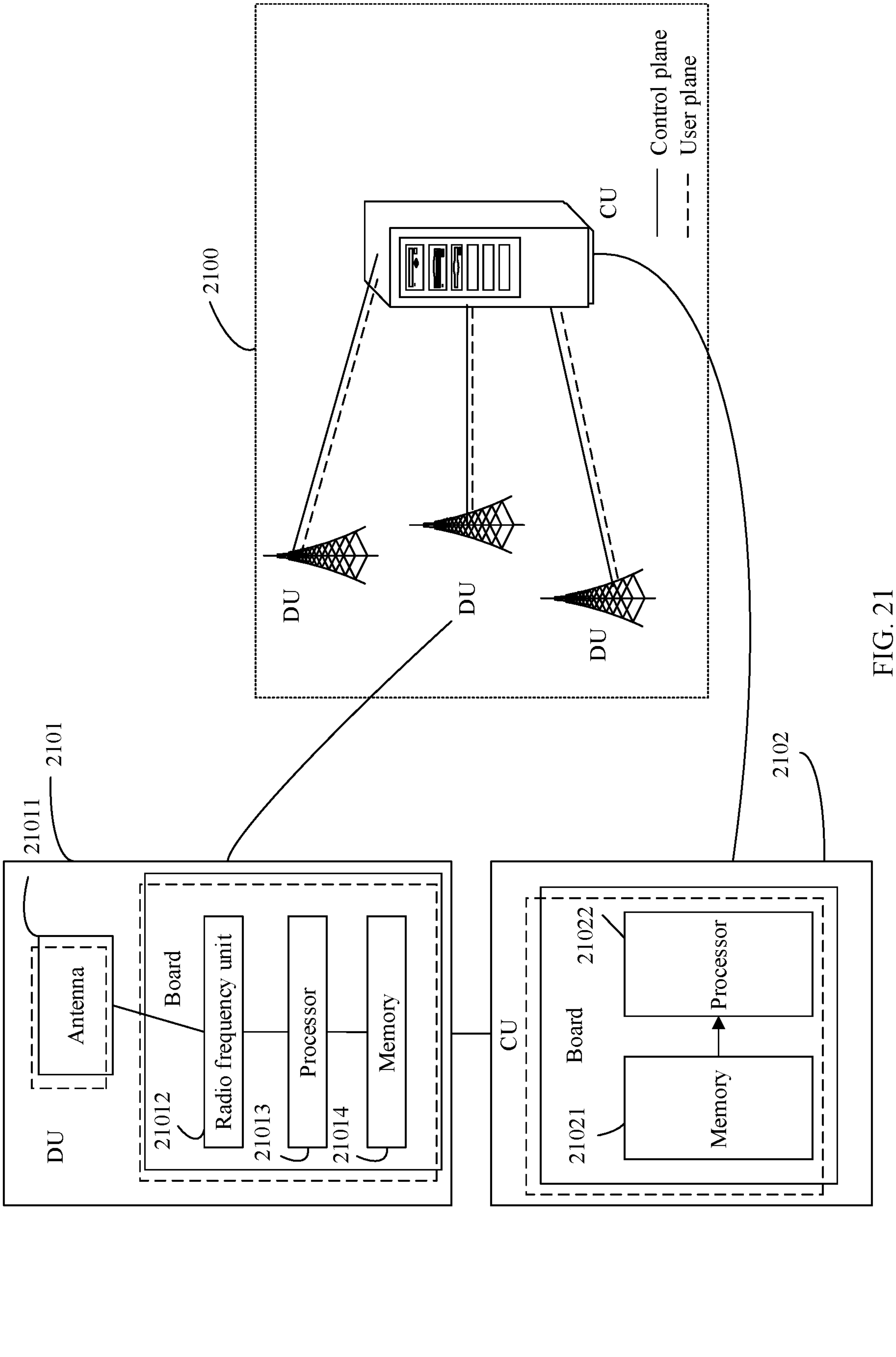
FIG. 21 is a schematic diagram of a structure of an access network device according to an embodiment of this application.

FIG. 21 is a schematic diagram of a structure of an access network device according to an embodiment of this application, for example, may be a schematic diagram of a structure of a base station. As shown in FIG. 21, the base station may be used in the system shown in FIG. 1, to perform functions of the access network device in the foregoing method embodiments. The base station 2100 may include one or more DUs 2101 and one or more CUs 2102. The CU 2102 may communicate with an NG core (next generation core network, NC) or an EPC. The DU 2101 may include at least one antenna 21011, at least one radio frequency unit 21012, at least one processor 21013, and at least one memory 21016. The DU 2101 is mainly configured to receive and send a radio frequency signal, convert a radio frequency signal and a baseband signal, and perform some baseband processing. The CU 2102 may include at least one processor 21022 and at least one memory 21021. The CU 2102 and the DU 2101 may communicate with each other through an interface. A control plane (Control plane) interface may be Fs-C, for example, F1-C. A user plane (User Plane) interface may be Fs-U, for example, F1-U.

The CU 2102 is mainly configured to perform baseband processing, control the base station, and the like. The DU 2101 and the CU 2102 may be physically disposed together, or may be physically separate, that is, in a distributed base station. The CU 2102 is a control center of the base station, may also be referred to as a processing unit, and is mainly configured to complete a baseband processing function. For example, the CU 2102 may be configured to control the base station to perform an operation procedure related to the access network device in the foregoing method embodiments.

Specifically, baseband processing on the CU and the DU may be divided based on a protocol layer of a wireless network. For example, functions of a PDCP layer and a layer above the PDCP layer are deployed on the CU, and functions of protocol layers below the PDCP layer, such as an RLC layer, a MAC layer, and a PHY layer are deployed on the DU.

In addition, optionally, the base station 2100 may include one or more radio frequency units (RUs), one or more DUs, and one or more CUs. The DU may include at least one processor 21013 and at least one memory 21014, the RU may include at least one antenna 21011 and at least one radio frequency unit 21012, and the CU may include at least one processor 21022 and at least one memory 21021.

In an instance, the CU 2102 may include one or more boards. A plurality of boards may jointly support a radio access network (for example, a 5G network) with a single access indication, or may separately support radio access networks (for example, an LTE network, a 5G network, or another network) with different access standards. The memory 21021 and the processor 21022 may serve one or more boards. In other words, a memory and a processor may be disposed on each board. Alternatively, a plurality of boards may share a same memory and a same processor. In addition, a necessary circuit may be disposed on each board. The DU 2101 may include one or more boards. A plurality of boards may jointly support a radio access network (for example, a 5G network) with a single access indication, or may separately support radio access networks (for example, an LTE network, a 5G network, or another network) with different access standards. The memory 21014 and the processor 21013 may serve one or more boards. In other words, a memory and a processor may be disposed on each board. Alternatively, a plurality of boards may share a same memory and a same processor. In addition, a necessary circuit may be disposed on each board.

Figure 22:
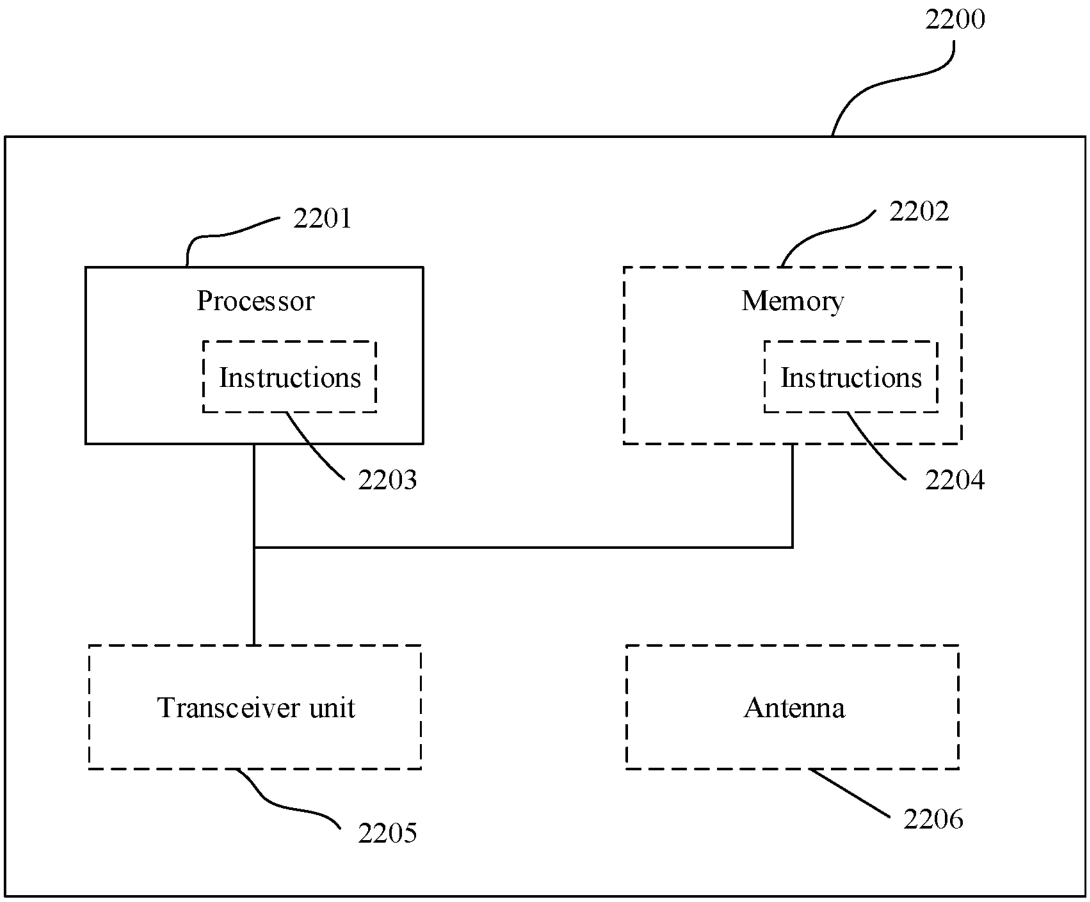
FIG. 22 is a schematic diagram of a structure of a communication apparatus according to an embodiment of this application.

FIG. 22 is a schematic diagram of a structure of a communication apparatus 2200. The communication apparatus 2200 may be configured to implement the methods described in the foregoing method embodiments. Refer to the descriptions in the foregoing method embodiments. The communication apparatus 2200 may be a chip, an access network device (such as a base station), a terminal, or the like.

The communication apparatus 2200 includes one or more processors 2201. The processor 2201 may be a general-purpose processor, a dedicated processor, or the like. For example, the processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program. The apparatus may include a transceiver unit configured to input (receive) and output (send) a signal. For example, the apparatus may be a chip, and the transceiver unit may be an input circuit and/or an output circuit or a communication interface of the chip. The chip may be used in a terminal, an access network device (for example, a base station), or a core network device. For another example, the apparatus may be a terminal or an access network device (for example, a base station), and the transceiver unit may be a transceiver, a radio frequency chip, or the like.

The communication apparatus 2200 includes the one or more processors 2201, and the one or more processors 2201 may implement the method performed by the base station or the terminal in embodiments shown in FIG. 6 to FIG. 19.

In a possible design, the communication apparatus 2200 includes a means (means) configured to receive indication information of a first threshold and a second threshold from a base station and perform data transmission, and a means (means) configured to determine to perform beam recovery on a TRP and send a beam recovery request MAC CE. Functions of the means may be implemented by using one or more processors. For example, sending may be performed by using one or more processors, a transceiver, an input/output circuit, or an interface of a chip. For details, refer to related descriptions in the foregoing method embodiments.

In a possible design, the communication apparatus 2200 includes a means (means) configured to send indication information of a first threshold and a second threshold to a terminal, and receive a beam recovery request MAC CE, and a means (means) configured to perform beam recovery. For details, refer to related descriptions in the foregoing method embodiment. For example, receiving may be performed by using a transceiver, an input/output circuit, an interface of a chip, or one or more processors.

Optionally, in addition to implementing the methods in embodiments shown in FIG. 6 to FIG. 19, the processor 2201 may further implement other functions.

Optionally, in a design, the processor 2201 may further include instructions 2203, where the instructions may be run on the processor, to enable the communication apparatus 2200 to perform the methods described in the foregoing method embodiments.

In another possible design, the communication apparatus 2200 may alternatively include a circuit. The circuit may implement the function of the access network device or the terminal in the foregoing method embodiments.

In still another possible design, the communication apparatus 2200 may include one or more memories 2202, storing instructions 2204. The instructions may be run on the processor, to enable the communication apparatus 2200 to perform the methods described in the foregoing method embodiments. Optionally, the memory may further store data. Optionally, the processor may also store instructions and/or data. For example, the one or more memories 2202 may store the indication information of the first threshold and the second threshold described in the foregoing embodiments, or other information in the foregoing embodiments. The processor and the memory may be separately disposed, or may be integrated together.

In yet still another possible design, the communication apparatus 2200 may further include a transceiver unit 2205 and an antenna 2206, or include a communication interface. The transceiver unit 2205 may be referred to as a transceiver, a transceiver circuit, a transceiver machine, or the like, and is configured to implement a transceiver function of the apparatus through the antenna 2206. The communication interface (not shown in the figure) may be used for communication between a core network device and an access network device, or communication between access network devices. Optionally, the communication interface may be a wired communication interface, for example, a fiber communication interface.

The processor 2201 may be referred to as a processing unit, and controls the apparatus (for example, a terminal, a base station, or an AMF).

This application further provides a communication system, including one or a combination of the foregoing one or more access network devices, one or more terminals, and one or more core network devices.

It should be understood that, the processor in embodiments of this application may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor, or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, all or some of the foregoing embodiments may be implemented in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner, for example, an optical fiber or a wireless manner, for example, infrared, microwave, or the like. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, communication apparatus, and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising at least one processing circuit, wherein the at least one processing circuit is coupled to a memory storing programming instructions for execution by the at least one processing circuit to perform operations comprising:

determining a beam failure recovery medium access control control element (MAC CE); and sending the beam failure recovery MAC CE, wherein the beam failure recovery MAC CE comprises cell beam recovery information units of one or more cells of a terminal device, wherein each of the cell beam recovery information units indicates beam recovery information of a corresponding cell, and the beam failure recovery MAC CE comprises:

a cell indication (C) field indicating a cell corresponding to the cell beam recovery information unit; and a transmit/receive point (TRP) beam recovery information unit quantity indication (N) field indicating a quantity of TRP beam recovery information units in the cell beam recovery information unit, wherein the TRP beam recovery information units indicate beam recovery information of a TRP;

wherein the TRP beam recovery information unit quantity indication (N) field occupies 8 bits or 32 bits, each bit corresponds to one cell, and wherein for each bit:

0 indicates that a quantity of TRP beam recovery information units in a cell corresponding to the bit is 1; or 1 indicates that a quantity of TRP beam recovery information units in a cell corresponding to the bit is 2.

2. The apparatus according to claim 1, wherein the cell beam recovery information unit comprises at least one TRP beam recovery information unit, and the TRP beam recovery information unit comprises one or more of:

an available candidate beam indication (AC) field indicating whether content in a candidate reference signal index (candidate RS ID) field is valid;

a candidate reference signal index (candidate RS ID) field indicating a reference signal index of a candidate beam; or a TRP indication (TI) field indicating the TRP corresponding to the TRP beam recovery information unit.

3. The apparatus according to claim 1, wherein the cell indicated by the cell indication (C) field comprises a special cell (SpCell).

4. The apparatus according to claim 3, wherein the special cell (SpCell) corresponds to a bit C0 in the cell indication (C) field.

5. The apparatus according to claim 1, wherein the cell indication (C) field comprises 8 bits C0 to C7 or 32 bits C0 to C31, each bit corresponds to one cell, and wherein for each bit:

1 indicates that for a cell corresponding to the bit, beam recovery information of an TRP on which beam recovery needs to be performed is present in the beam failure recovery MAC CE; or 0 indicates that for a cell corresponding to the bit, beam recovery information of an TRP on which beam recovery needs to be performed is not present in the beam failure recovery MAC CE.

6. The apparatus according to claim 1, wherein the available candidate beam indication (AC) field occupies 1 bit, and wherein:

the available candidate beam indication (AC) field being 1 indicates that the terminal device finds an available candidate beam for a corresponding TRP; or the available candidate beam indication (AC) field being 0 indicates that the terminal device does not find an available candidate beam for a corresponding TRP.

7. The apparatus according to claim 1, wherein the operations further comprising:

before sending the beam failure recovery MAC CE, searching for candidate beams for the one or more TRPs in the one or more cells to determine the beam failure recovery MAC CE;

sending the beam failure recovery MAC CE; and after receiving a response, determining that beam recovery is completed.

8. The apparatus according to claim 1, wherein the operations further comprising:

before the sending the beam failure recovery MAC CE, collecting statistics on a quantity of beam failure instance times of each of the one or more TRPs in the one or more cells, and when the quantity of beam failure instance times of the TRP is greater than a first threshold and less than a second threshold, determining to perform beam recovery on the TRP.

9. The apparatus according to claim 8, wherein the operations further comprising:

when the quantity of beam failure instance times of the TRP is greater than or equal to the second threshold, determining that a beam of the TRP is in a beam failure state.

10. The apparatus according to claim 8, wherein the operations further comprising:

receiving indication information of the first threshold and the second threshold.

11. The apparatus according to claim 8, wherein the statistics on the quantity of beam failure instance times is collected by using a beam failure instance counter and a beam failure detection timer.

12. An apparatus, comprising at least one processing circuit, wherein the at least one processing circuit is coupled to a memory storing programming instructions for execution by the at least one processing circuit to perform operations comprising:

receiving a beam failure recovery medium access control control element (MAC CE) from a terminal device, wherein the beam failure recovery MAC CE comprises cell beam recovery information units of one or more cells of the terminal device, wherein each of the cell beam recovery information units indicates beam recovery information of a corresponding cell, and the beam failure recovery MAC CE comprises:

a cell indication (C) field indicating a cell corresponding to the cell beam recovery information unit; and a transmit/receive point (TRP) beam recovery information unit quantity indication (N) field indicating a quantity of TRP beam recovery information units in the cell beam recovery information unit, wherein the TRP beam recovery information units indicate beam recovery information of a TRP;

wherein the TRP beam recovery information unit quantity indication (N) field occupies 8 bits or 32 bits, each bit corresponds to one cell, and wherein for each bit:

0 indicates that a quantity of TRP beam recovery information units in a cell corresponding to the bit is 1; or 1 indicates that a quantity of TRP beam recovery information units in a cell corresponding to the bit is 2.

13. The apparatus according to claim 12, wherein the cell beam recovery information unit comprises at least one TRP beam recovery information unit, and the TRP beam recovery information unit comprises one or more of:

an available candidate beam indication (AC) field indicating whether content in a candidate reference signal index (candidate RS ID) field is valid;

a candidate reference signal index (candidate RS ID) field indicating a reference signal index of a candidate beam; or a TRP indication (TI) field indicating the TRP corresponding to the TRP beam recovery information unit.

14. The apparatus according to claim 12, wherein the cell indicated by the cell indication (C) field comprises a special cell (SpCell).

15. The apparatus according to claim 14, wherein the special cell (SpCell) corresponds to a bit C0 in the cell indication (C) field.

16. The apparatus according to claim 12, wherein the cell indication (C) field comprises 8 bits C0 to C7 or 32 bits C0 to C31, each bit corresponds to one cell, and wherein for each bit:

1 indicates that for a cell corresponding to the bit, beam recovery information of an TRP on which beam recovery needs to be performed is present in the beam failure recovery MAC CE; or 0 indicates that for a cell corresponding to the bit, beam recovery information of an TRP on which beam recovery needs to be performed is not present in the beam failure recovery MAC CE.

17. The apparatus according to claim 12, wherein the available candidate beam indication (AC) field occupies 1 bit, and wherein:

the available candidate beam indication (AC) field being 1 indicates that the terminal device finds an available candidate beam for a corresponding TRP; or the available candidate beam indication (AC) field being 0 indicates that the terminal device does not find an available candidate beam for a corresponding TRP.

18. A communication method, comprising:

determining a beam failure recovery medium access control control element (MAC CE); and sending the beam failure recovery MAC CE, wherein the beam failure recovery MAC CE comprises cell beam recovery information units of one or more cells of a terminal device, wherein each of the cell beam recovery information units indicates beam recovery information of a corresponding cell, and the beam failure recovery MAC CE comprises:

a cell indication (C) field indicating a cell corresponding to the cell beam recovery information unit; and a transmit/receive point (TRP) beam recovery information unit quantity indication (N) field indicating a quantity of TRP beam recovery information units in the cell beam recovery information unit, wherein the TRP beam recovery information units indicate beam recovery information of a TRP;

wherein the TRP beam recovery information unit quantity indication (N) field occupies 8 bits or 32 bits, each bit corresponds to one cell, and wherein for each bit:

0 indicates that a quantity of TRP beam recovery information units in a cell corresponding to the bit is 1; or 1 indicates that a quantity of TRP beam recovery information units in a cell corresponding to the bit is 2.

19. The method according to claim 18, wherein the cell beam recovery information unit comprises at least one TRP beam recovery information unit, and the TRP beam recovery information unit comprises one or more of:

an available candidate beam indication (AC) field indicating whether content in a candidate reference signal index (candidate RS ID) field is valid;

a candidate reference signal index (candidate RS ID) field indicating a reference signal index of a candidate beam; or a TRP indication (TI) field indicating the TRP corresponding to the TRP beam recovery information unit.

20. The method according to claim 18, wherein the cell indicated by the cell indication (C) field comprises a special cell (SpCell) and the special cell (SpCell) corresponds to a bit C0 in the cell indication (C) field.

* * * * *